(12) United States Patent
Gunsaulis et al.

(10) Patent No.: US 7,510,029 B2
(45) Date of Patent: Mar. 31, 2009

(54) SYSTEM FOR TRACKING AND MAINTAINING AN ON-GRADE HORIZONTAL BOREHOLE

(75) Inventors: Floyd R. Gunsaulis, Perry, OK (US);
Brian K. Bailey, Stillwater, OK (US);
Scott B. Cole, Edmond, OK (US);
Kelvin P. Self, Stillwater, OK (US);
Gerald A. Stangl, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 202 days.

(21) Appl. No.: 11/466,725

(22) Filed: Aug. 23, 2006

(65) Prior Publication Data
US 2007/0044536 A1    Mar. 1, 2007

Related U.S. Application Data

(60) Provisional application No. 60/710,523, filed on Aug. 23, 2005, provisional application No. 60/734,670, filed on Nov. 8, 2005.

(51) Int. Cl.
*E21B 7/04* (2006.01)
*E21B 47/02* (2006.01)

(52) U.S. Cl. .................................. 175/61; 175/45
(58) Field of Classification Search ............... 175/61, 175/45, 62; 33/313; 324/329
See application file for complete search history.

(56) References Cited

U.S. PATENT DOCUMENTS

| | | | |
|---|---|---|---|
| 3,529,682 A * | 9/1970 | Coyne et al. ................. 175/45 |
| 3,894,230 A * | 7/1975 | Rorden et al. ................ 356/622 |
| 4,026,371 A | 5/1977 | Takada et al. |
| 4,255,883 A | 3/1981 | Ealy |
| 4,403,664 A * | 9/1983 | Sullinger ..................... 175/24 |
| 4,422,800 A | 12/1983 | Parish |
| 4,438,820 A | 3/1984 | Gibson |
| 4,480,942 A | 11/1984 | Farrow |
| 4,820,041 A * | 4/1989 | Davidson et al. ........... 356/3.12 |
| 4,836,669 A * | 6/1989 | Teach ........................ 359/857 |
| 4,924,450 A * | 5/1990 | Brashear et al. ............. 367/118 |
| 4,955,439 A * | 9/1990 | Kinnan ...................... 175/45 |
| 5,014,795 A | 5/1991 | Gibson |
| 5,055,666 A * | 10/1991 | Miyahara ................. 250/206.1 |
| 5,108,229 A | 4/1992 | Slanker |

(Continued)

OTHER PUBLICATIONS

Pipeline & Construction Utilities, "Directional Boring Shows Value Of Municipal Rehab", brochure, Mar. 1996, vol. 51, No. 3.

(Continued)

*Primary Examiner*—David J Bagnell
*Assistant Examiner*—Cathleen R Hutchins
(74) *Attorney, Agent, or Firm*—Tomlinson & O'Connell, PC

(57) ABSTRACT

A tracking receiver system is used to track the progress of a downhole tool along a subsurface path having a desired grade. The tracking receiver system is adapted to detect a reference line originating from a reference line receiver and to determine the position of the downhole tool along a desired subsurface path relative to the reference line. In an alternative embodiment the tracking receiver system may comprise a global positioning satellite system to provide information used to determine the position of the downhole tool relative to the desired subsurface path.

72 Claims, 17 Drawing Sheets

U.S. PATENT DOCUMENTS

| | | | | |
|---|---|---|---|---|
| 5,182,863 | A * | 2/1993 | Rando | 33/227 |
| 5,186,579 | A | 2/1993 | Hanamoto et al. | |
| 5,322,391 | A * | 6/1994 | Fisk | 175/73 |
| 5,361,854 | A | 11/1994 | Tull et al. | |
| 5,363,926 | A * | 11/1994 | Mizuno | 175/45 |
| 5,427,475 | A | 6/1995 | Coss | |
| 5,513,710 | A * | 5/1996 | Kuckes | 175/45 |
| 5,529,437 | A | 6/1996 | Filipowski et al. | |
| 5,685,082 | A | 11/1997 | Proulx | |
| 5,764,062 | A * | 6/1998 | Mercer | 324/329 |
| 5,771,978 | A * | 6/1998 | Davidson et al. | 172/4.5 |
| 5,937,954 | A * | 8/1999 | Puttmann et al. | 175/61 |
| 5,960,551 | A * | 10/1999 | Nishi et al. | 33/292 |
| 6,160,616 | A * | 12/2000 | Ohtomo et al. | 356/247 |
| 6,161,630 | A * | 12/2000 | Stump et al. | 175/26 |
| 6,199,643 | B1 * | 3/2001 | Hesse et al. | 175/61 |
| 6,286,607 | B1 * | 9/2001 | Ohtomo et al. | 172/4.5 |
| 6,443,235 | B1 * | 9/2002 | Ohtomo et al. | 172/4.5 |
| 6,543,550 | B2 * | 4/2003 | Hall | 175/26 |
| 6,682,264 | B1 | 1/2004 | McGillis | |
| 6,737,867 | B2 * | 5/2004 | Brune et al. | 324/326 |
| 6,755,263 | B2 * | 6/2004 | Alft et al. | 175/61 |
| 6,776,246 | B1 * | 8/2004 | Nickel et al. | 175/45 |
| 6,827,158 | B1 * | 12/2004 | Dimitroff et al. | 175/62 |
| 7,086,808 | B2 | 8/2006 | Wentworth et al. | |
| 7,127,821 | B1 * | 10/2006 | Weisz et al. | 33/277 |
| 2001/0022239 | A1 * | 9/2001 | Brune et al. | 175/45 |
| 2003/0024739 | A1 * | 2/2003 | Runquist et al. | 175/61 |
| 2003/0201126 | A1 * | 10/2003 | Brune et al. | 175/45 |
| 2003/0205410 | A1 * | 11/2003 | Koch et al. | 175/45 |
| 2004/0040745 | A1 * | 3/2004 | Kuckes | 175/26 |
| 2004/0125365 | A1 * | 7/2004 | Ohtomo et al. | 356/141.5 |
| 2005/0023036 | A1 * | 2/2005 | Cole et al. | 175/26 |
| 2005/0280420 | A1 * | 12/2005 | Mercer | 324/329 |
| 2006/0012777 | A1 * | 1/2006 | Talbot et al. | 356/139.01 |
| 2006/0225921 | A1 * | 10/2006 | Mercer et al. | 175/45 |
| 2007/0052950 | A1 * | 3/2007 | Taylor et al. | 356/139.01 |
| 2007/0187148 | A1 * | 8/2007 | Self et al. | 175/53 |

OTHER PUBLICATIONS

Ditch Witch, "Construction Solutions", brochure, Feb. 2003, vol. 22, No. 1.

Siggi Finnsson "Crossing The Antonine Wall", article, Aug. 2001, Reader Service No. 16.

Jeff Griffin, "Contractor Makes The Grade On Sewer Job", article, Sep. 2003.

No Dig International "Directional Drilling Impacts Water And Sewerage Markets Across North America", Article, Mar. 2000, vol. 11, No. 3.

* cited by examiner

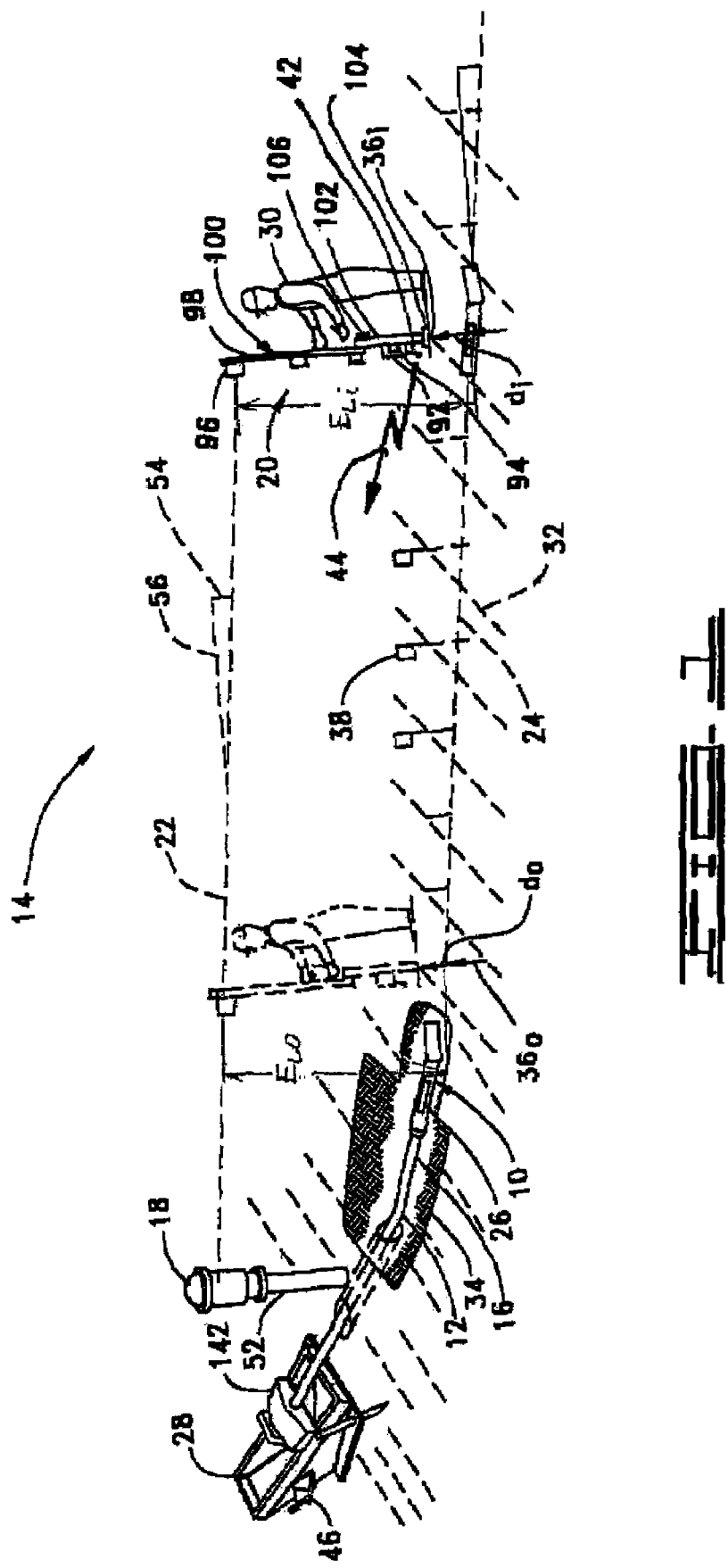

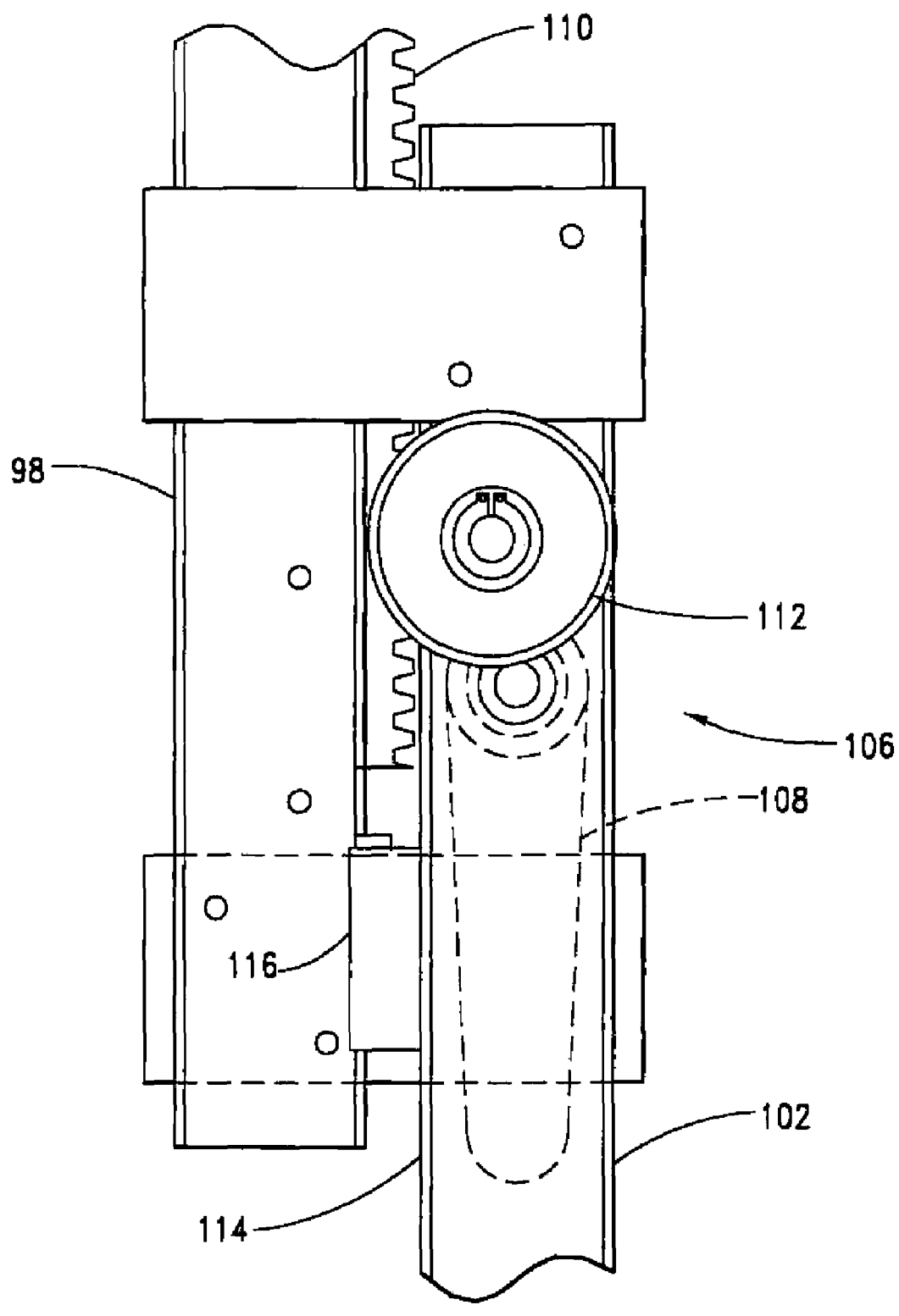
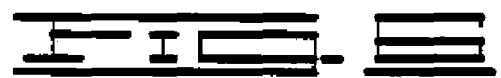

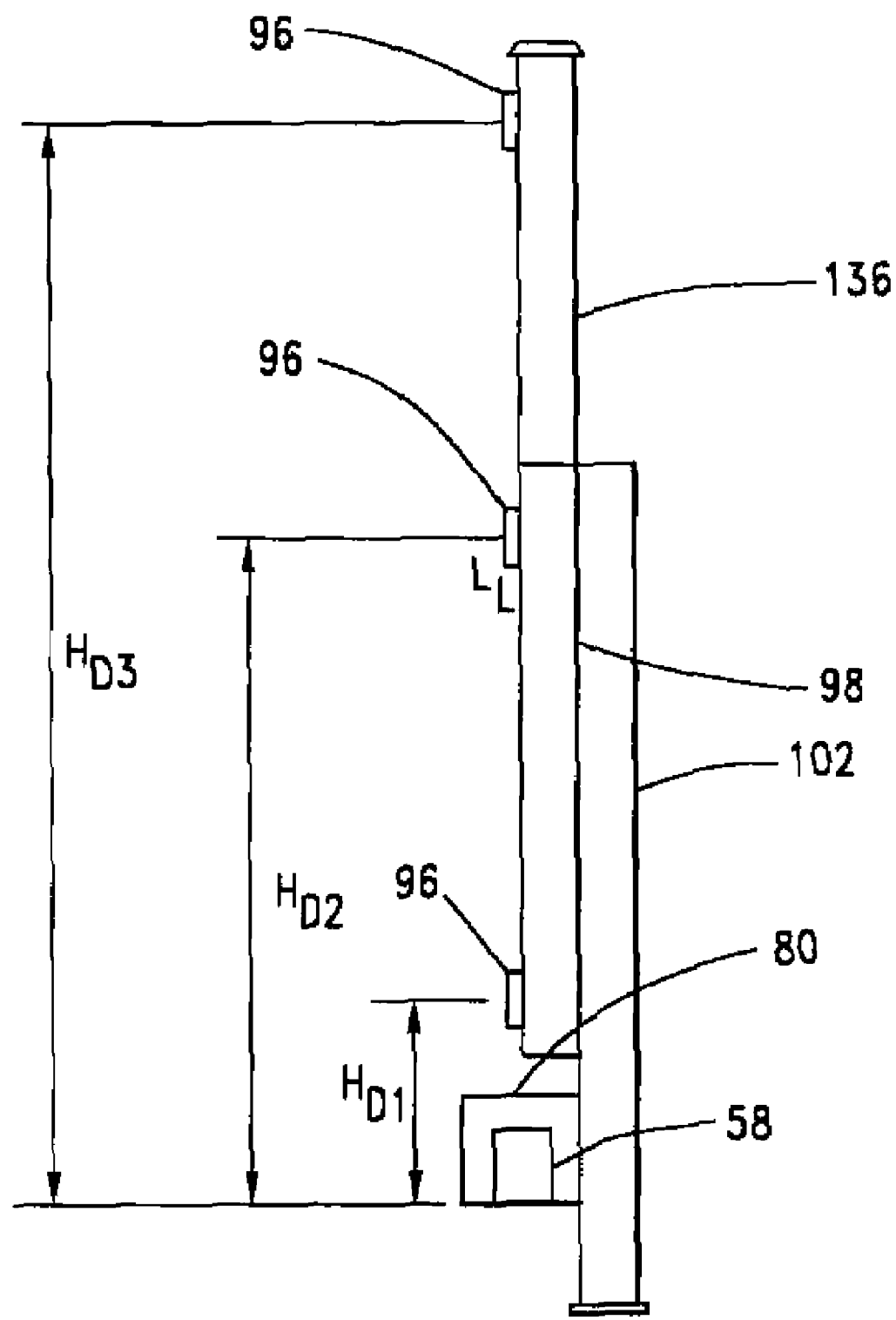
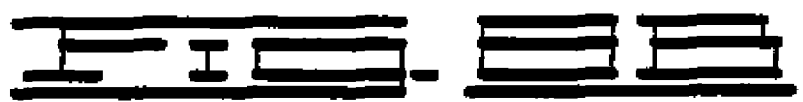

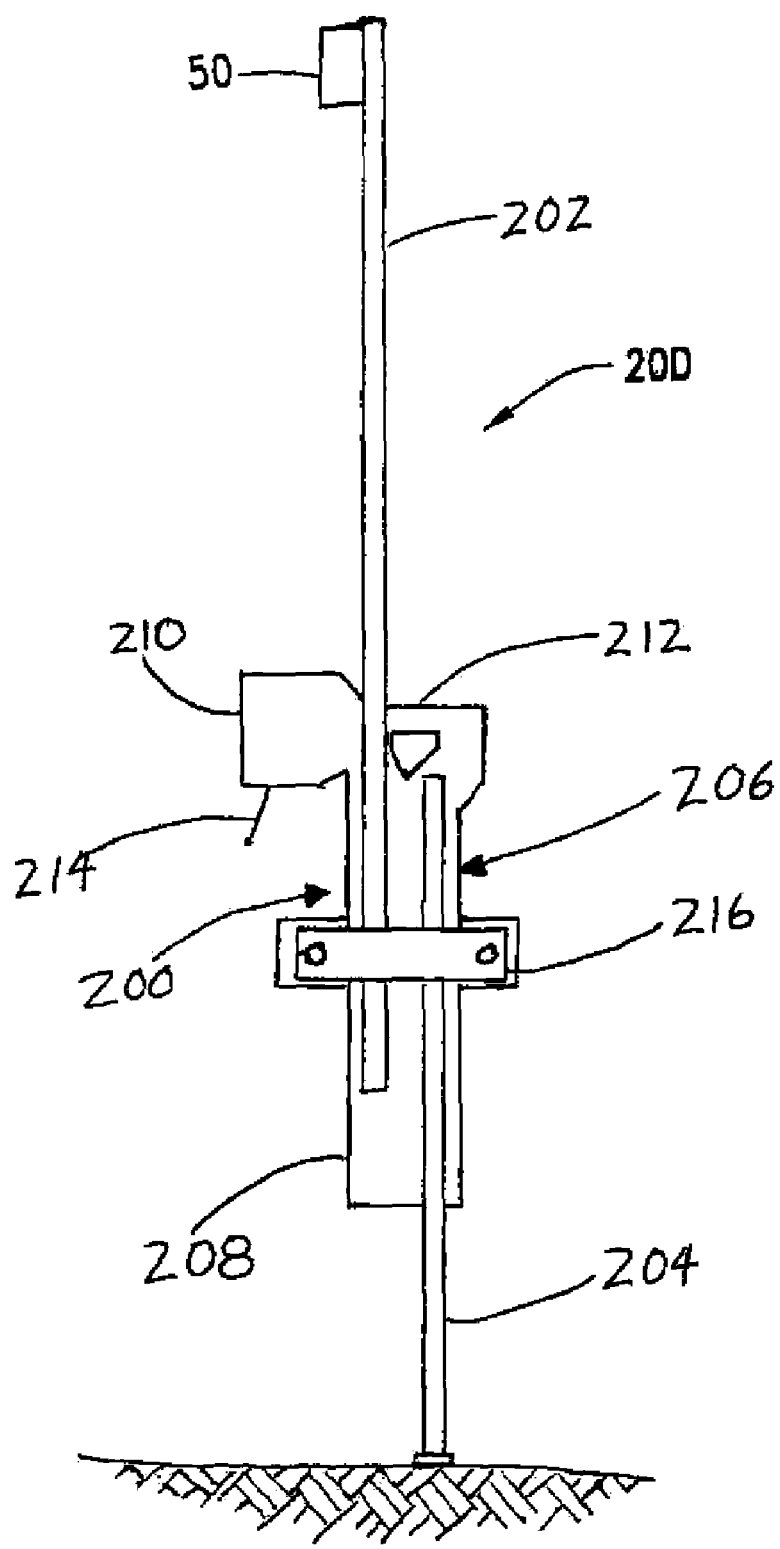

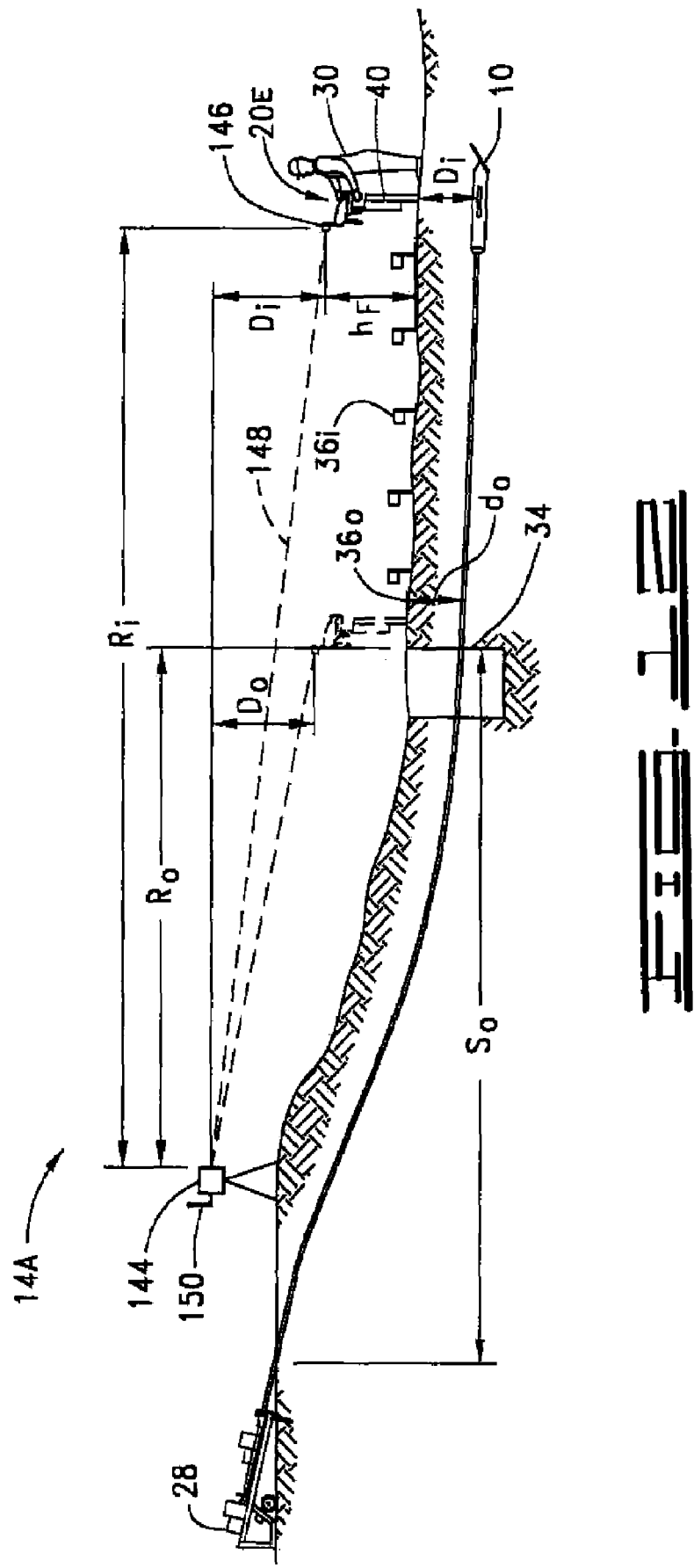

SYSTEM FOR TRACKING AND MAINTAINING AN ON-GRADE HORIZONTAL BOREHOLE

CROSS REFERENCE TO RELATED APPLICATIONS

This application claims priority of U.S. Provisional Patent Application Ser. No. 60/734,670 filed Nov. 8, 2005 and U.S. Provisional Patent Application Ser. No. 60/710,523 filed Aug. 23, 2005, the contents of which are incorporated herein by reference.

FIELD OF THE INVENTION

The present invention relates generally to installation of underground utilities and specifically to a tracking system for the trenchless installation of such utilities via horizontal directional drilling on-grade.

SUMMARY OF THE INVENTION

The present invention is directed to an on-grade horizontal directional drilling system. The horizontal directional drilling system comprises a downhole tool, a reference line generator, and a tracking receiver system. The downhole tool is operatively connected to a downhole end of a drill string and steerable along a desired subsurface path. The reference line generator is adapted to establish a reference line having a grade substantially the same as the grade of the desired subsurface path. The tracking receiver system comprises a sensor assembly, a reference line receiver, a means for measuring the distance between the reference line receiver and the sensor assembly, and a processor. The reference line receiver is adapted to detect signals emitted from the downhole tool. The reference line receiver is adapted to detect the reference line. The processor is adapted to process the signals detected by the sensor assembly and the measured distance to determine the position of the boring tool relative to the reference line.

The present invention further includes an on-grade tracking receiver system. The on-grade tracking receiver system is adapted to track the progress of a boring tool. The boring tool is steerable along a desired subsurface path substantially parallel with a reference line having a grade. The tracking receiver comprises a sensor assembly, a reference line receiver, a means for measuring the distance between the reference line receiver, and a processor. The sensor assembly is adapted to detect signals emitted from the boring tool and the reference line receiver is adapted to detect the reference line. The processor is adapted to process the signals detected by the sensor assembly and the measured distance between the reference line receiver and the sensor assembly to determine the position of the boring tool relative to the reference line.

The present invention is further directed to a method for creating an on-grade borehole. The method comprises establishing a reference line at a predetermined grade substantially the same as a grade of a desired subsurface path and determining a position of a boring tool with a receiving tracker system wherein the receiving tracker assembly comprises a sensor assembly. The method further comprises detecting the reference line at the receiving tracker system, measuring a distance between the reference line and the sensor assembly, and determining the position of the boring tool relative to the reference line based on the determined position of the boring tool and the distance between the reference line and the sensor assembly.

Further, the present invention includes a method for determining a position of a boring tool relative to a reference line. The reference line has a selected grade corresponding with a grade of a desired bore path. The method comprises locating the boring tool with a sensor assembly and measuring a distance between the boring tool and the sensor assembly. The method further includes locating the reference line, measuring a distance between the reference line and the sensor assembly, and determining a distance between the reference line and the boring tool based on the measured distance between the boring tool and the sensor assembly and the measured distance between the reference line and the sensor assembly.

Further still, the present invention is directed to an on-grade horizontal directional drilling system comprising a downhole tool, a tracking receiver system, an optical survey system and a processor. The downhole tool is operatively connected to a downhole end of a drill string and steerable along a desired subsurface path. The tracking receiver system comprises a sensor assembly adapted to detect signals emitted from the downhole tool. The optical survey system is adapted to measure the range and elevation of the tracking receiver system relative to a starting above-ground reference point disposed along the desired subsurface path. The processor is adapted to process the signals detected by the sensor assembly and the range and elevation of the sensor assembly to determine the position of the boring tool.

BRIEF DESCRIPTION OF THE DRAWINGS

FIG. 1 is a diagrammatic representation of a horizontal directional drilling system, utilizing an on-grade tracking system constructed in accordance with the present invention. FIG. 1 illustrates the use of a reference line generator disposed proximate to a drill unit.

FIG. 6 is a close-up, partially sectional view of a device for manually extending the frame of the tracking receiver system of FIG. 5.

FIG. 8B is a diagrammatic representation of the tracking receiver system of FIG. 8A in the fully collapsed position to illustrate the distances between each sensor array and the bottom of the sensor assembly.

FIG. 9 shows a diagrammatic representation of an alternative tracking receiver system of the present invention.

FIG. 12 is a diagrammatic side view representation of an alternative on-grade horizontal directional drilling system adapted to use a total station survey instrument.

FIG. 13 is a diagrammatic side view representation of an alternative on-grade horizontal directional drilling system adapted to use a real time kinematic GPS survey instrument.

FIG. 16 is an overhead view of an alternate system to aid in maintaining the desired lateral alignment of the bore.

DESCRIPTION OF THE PREFERRED EMBODIMENTS

Figure 2A:
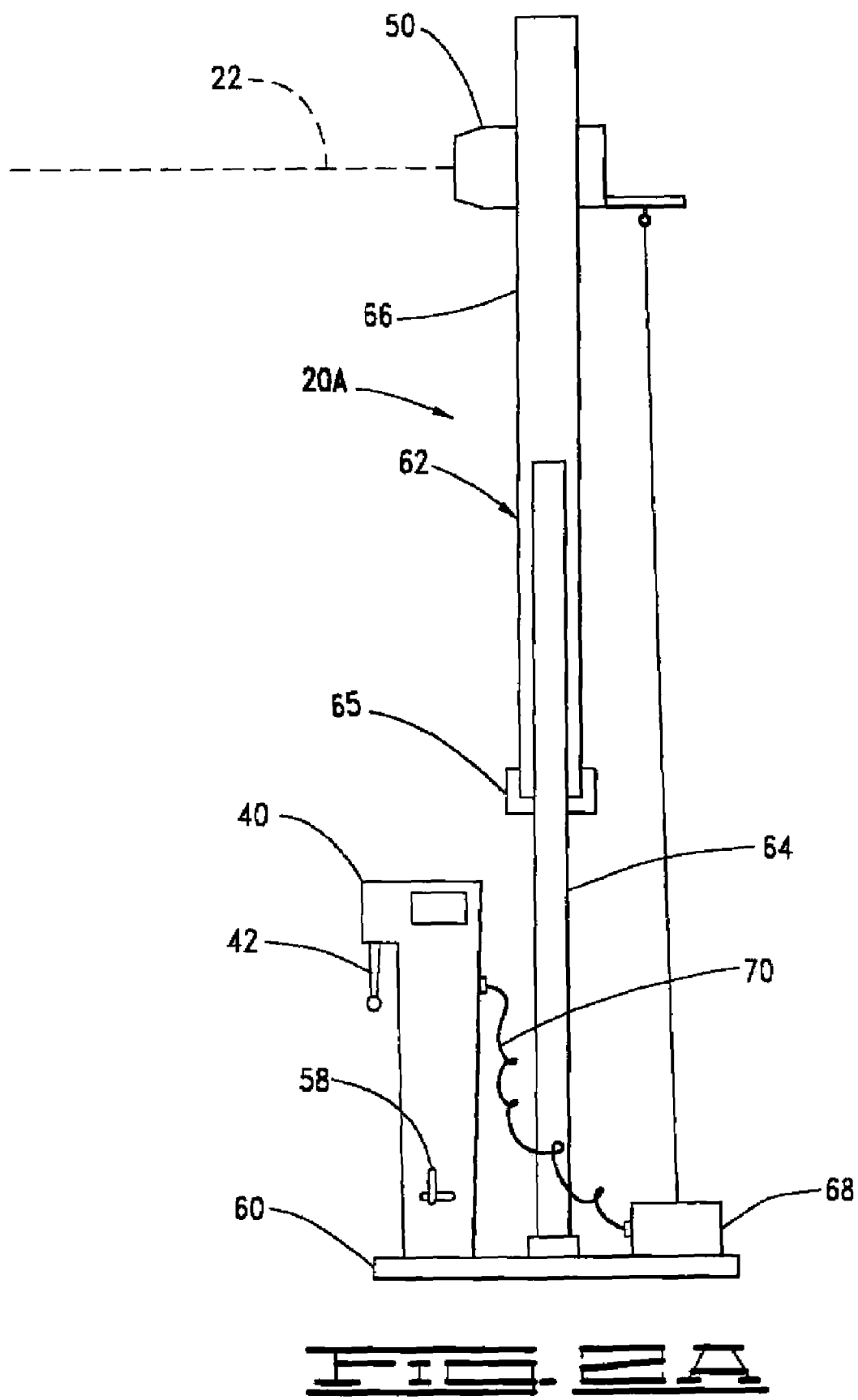
FIG. 2A is a diagrammatic representation of a tracking receiver system of the present invention.

Horizontal directional drilling (HDD) permits installation of utility services or other products underground in an essentially "trenchless" manner, eliminating surface disruption along the length of the project and reducing the likelihood of damaging previously buried products. The typical HDD borepath begins from the ground surface as an inclined segment that is gradually leveled off as the desired product installation depth is neared. This interval is generally referred to as the "set back distance" at which the downhole tool 10 (FIG. 1) must enter the ground in order to reach the desired depth without violating bend radius limits of a drill string 12. One experienced in making HDD installations acquires a "feel" for the amount of set back required to level the downhole tool 10 off at a given depth. However, on critical installations, this segment and other portions of the borepath are often pre-planned utilizing surveying instruments and borepath planning software such as described in U.S. patent application Ser. No. 10/404,550 "Automatic Path Generation and Correction System" filed Apr. 1, 2003, the contents of which are incorporated herein by reference. The portion of the borepath where the installed product will lay may have a specified depth (or at least a minimum-maximum range) all along its length. Alternately, a horizontal or near horizontal path may be desirable instead.

HDD has proven to be a useful method for the installation of numerous types of underground utilities—such as telephone and electric lines and gas and water pipes. One application where HDD has had only moderate success is in the installation of gravity flow liquid conduits such as sewer and storm drainage. Installation of gravity flow piping is tedious and requires care to be taken to ensure that the proper grade is maintained for effective flow of materials through the sewer or drainage. This is especially important when very shallow grade (<1% grade) is specified. Accordingly, various methods and systems have been developed to conduct on-grade boring operations. However, there remains a need for improved control of the downhole tool during on-grade boring operations.

With reference to FIG. 1, there is shown therein an on-grade horizontal directional drilling system 14 constructed in accordance with the present invention. The HDD system 14 comprises the downhole tool 10 operatively connected to a downhole end 16 of the drill string 12, a reference line generator 18, and a tracking receiver system 20. As discussed in more detail below, the reference line generator 18 is adapted to establish a reference line 22 having a grade, or slope, substantially the same as the grade of a desired subsurface path 24.

The tracking receiver system 20 may be used to determine the position and orientation of the downhole tool using "walkover" techniques. For walkover tracking, a beacon 26 is disposed within the downhole tool 10 and adapted to transmit a magnetic field. A drill unit 28 advances the drill string 12 and the downhole tool 10 through the ground. As referenced herein, a downhole tool 10 may be a boring tool for use during a boring operation or a backreamer for use in a backreaming operation. Though discussed primarily with regard to the boring operation, the apparatus and methods discussed herein are equally applicable to a backreaming operation. An operator 30 on the surface of the ground —utilizing the tracking receiver system 20—follows the beacon 26 and periodically determines the depth and direction of the downhole tool 10 utilizing techniques known in the art.

While the present invention is described herein with reference to a single pipe drill string and a boring tool having a single beacon, it will be appreciated that a dual-pipe drill system and tooling as disclosed in U.S. Pat. No. 6,827,158 may be utilized with the invention. Additionally, an alternative version of the two pipe system as disclosed in previously referenced U.S. patent application Ser. No. 10/724,572 having a trailing second beacon may be used in accordance with the present invention.

Basic walkover style position and orientation sensing systems are described in U.S. Pat. No. 5,264,795 issued to Rider, U.S. Pat. No. 5,850,624 issued to Gard, et. al., and U.S. Pat. No. 5,880,680 issued to Wisehart, et. al., the contents of which are incorporated herein by reference. Sensors for determining the orientation of the downhole tool 10 are described in the latter two patents as well as in U.S. Pat. Nos. 5,133,417 and 5,174,033 issued to Rider and U.S. Pat. No. 5,703,484 issued to Bieberdorf, et. al., the contents of which are also incorporated herein by reference.

In FIG. 1, dashed lines 32 directed diagonally upward toward the right indicate the surface of the ground. The HDD unit 28 is set up at a pre-planned position such that the downhole tool 10 reaches a desired depth, grade and left-right alignment at the start of the on-grade portion of the bore. Generally, this location will coincide with a starting pit 34. The downhole tool 10 is shown entering the ground at the forward end of the starting pit 34—illustrated by a cut-away of the soil overburden. The downhole tool 10 may be supported by a crane or backhoe (not shown) as it passes through the starting pit 34, so minor adjustments in depth and alignment are possible prior to ground re-entry. Proper positioning at this point $36_0$ and at selected other locations $36_i$ along the on-grade segment 24 of the borepath is verified by the tracking receiver system 20. As the bore progresses, the tracking receiver system 20 is moved directly above of the downhole tool 10 using techniques known in the industry.

A preferred practice with the method of the present invention is to pre-mark the desired subsurface path 24 on the ground 32 with a taut string, marker flags 38, paint marks or some other marking method. By doing so, the line (right/left deviation) of the bore may also be monitored closely to assure that it does not wander out of the allotted right/left horizontal window for the bore. Flags 38 may be disposed on the ground 32 at points between the operator 30 and the starting pit 34 above where the downhole tool 10 has traveled.

Certain tracking receiver systems allow depth readings to be obtained without being directly above the beacon 10. One example is disclosed in U.S. Patent Application No. 60/680,780 "Dipole Locator Utilizing Multiple Measurement Points" filed May 13, 2005, incorporated herein by its reference. When incorporated into the present invention, this tracking receiver system may be positioned over the desired subsurface borepath 24 and step-wise advanced to stay within range of the beacon 26.

The tracking receiver system 20 of the present invention typically includes a tracker 40 having a conventional sensor assembly, a display and controls (not shown) for use by the operator 30. The tracker 40 may also have a radio link 42 for single or bi-directional communication of data 44 to and from a display unit (not shown) mounted at the HDD unit 28 to provide information related to the bore to an operator stationed at the HDD unit. Alternatively, communication may be with a system 46 at the drill unit 28 that automatically operates and coordinates the various functions comprising the drilling operation. Such an automated control system is disclosed in commonly assigned U.S. Patent Application Publication No. 2004/0028476 "System and Method for Automatically Drilling and Backreaming a Horizontal Bore Underground", the contents of which are incorporated herein by reference. As used herein, automatic operation is intended to refer to a drilling interval or sequence of drilling operations that can be accomplished without operator intervention and within certain predetermined tolerances.

Continuing with FIG. 1, the tracking receiver system 20 may comprise an extendable frame 100 adapted to support a sensor assembly 92 having a plurality of horizontally separated antenna arrays 94 for detecting signals from the beacon 26 and a plurality of reference line detectors 96 vertically spaced along the frame. Alternatively, a sensor assembly with a single antenna array set may be utilized with the current invention. The antenna arrays 94 may each comprise a set of tri-axial antennas adapted to detect a magnetic field signal emitted from the beacon 26 and are supported by a lower pole 102 having a foot 104. The reference line detectors 96 may comprise photo detector arrays that are supported on or within the upper pole 98 or extension pole or poles of the frame 100. A manually actuated device 106 may be supported on the frame 100 and adapted to move the upper pole 98 relative to the lower pole 102 to raise and lower the detectors 96. The tracking receiver system of FIG. 1 is discussed in more detail with reference to FIGS. 5-8.

Referring still to FIG. 1, once the start point $36_0$ of the on-grade portion of the bore is reached, the reference line generator 18 is positioned in line with the intended on-grade borepath 24. The reference line generator 18 is adapted to establish the reference line 22. The reference line 22 has a grade substantially the same as the grade of the desired subsurface path 24. In accordance with the present invention, the reference line generator 18 may comprise a laser transmitter adapted to generate a rotating beam laser level projected as a plane, generally positioned a few feet above the ground surface 32. A pedestal 52 or tripod-mounted reference line generator 18 readily allows this plane to be inclined off horizontal at a particular slope (grade) in one selected direction. A commercially available reference line generator is the Topcon RL-H3C series and its associated laser receiver. Whatever grade the bore is to proceed at, whether positive or negative, the reference line generator 18 will be set up such that a reference line 22 projects the target grade (rise 54/run 56) specified for installation of the product pipe along its desired heading. When a rotating laser plane is used as the reference line generator 18, the vector of reference line 22 lies within a projected plane whose axis is parallel to the bore path at a fixed distance above the on-grade segment of the planned borepath. The axis of the plane perpendicular to the desired bore path should be set horizontal or at a 0% grade. In the case of a rotating laser plane, the projected plane will be used as a reference elevation standard at each of the various tracking locations $36_i$ on the ground surface 32 along the intended on-grade borepath 24. These locations $36_i$ may be spaced at regular, reasonably close intervals (e.g., 2 to 5 feet apart).

Turning now to FIG. 2A, a tracking receiver system 20 of the present invention is shown. The tracking receiver system 20A comprises a reference line receiver 50 and the tracker 40. The tracker 40 comprises a sensor assembly 58 adapted to detect signals from the downhole tool 10 (FIG. 1). The sensor assembly 58 comprises at least one antenna adapted to detect the signal emitted from the beacon 26 (FIG. 1). In the embodiment of FIG. 2A the sensor assembly 58 comprises a tri-axial antenna array.

The tracker 40 is supported on an extendable frame 62. The extendable frame 62 comprises a base 60, a first member 64 connected to the base 60, and a second member 66 operatively connected to the first member 64 and adapted to support the reference line receiver 50. The reference line receiver 50 shown in FIG. 2A comprises a laser receiver adapted to receive the reference line 22. The second member 66 is also adapted to support a means for measuring a distance between the reference line receiver 50 and the sensor assembly 58. The means shown in FIG. 2A comprises a string potentiometer 68 supported on the frame 62 to measure a change in distance between the reference line receiver 50 and the base 60 when the second member 66 is moved up or down relative to the first member 64. Additionally, reference line receiver 50 mounted on second member 66 with an adjustable clamp 65 and may be moved along second member 66. The string potentiometer 68 is connected to the tracker 40 via cable 70 to transmit data indicative of the distance between the reference line receiver 50 and the base 60. Alternatively, the communication between the string potentiometer 68 and the tracker 40 may be accomplished by wireless means. One skilled in the art will appreciate that the alternative distance measuring devices such as an optical device, ultrasonic device, or other means may be mounted on frame 62 to measure the distance between the reference line receiver and the base 60. It will also be apparent that the string potentiometer 68 could be co-mounted with the reference line receiver 50 and the point of attachment for the end of the measurement cable could be located on the base 60 of the device. Similarly, optical, ultrasonic, or other measurement devices could be adapted to mount either on the bracket holding the reference line receiver 50 or alternatively, mount on the base 60.

Figure 2B:
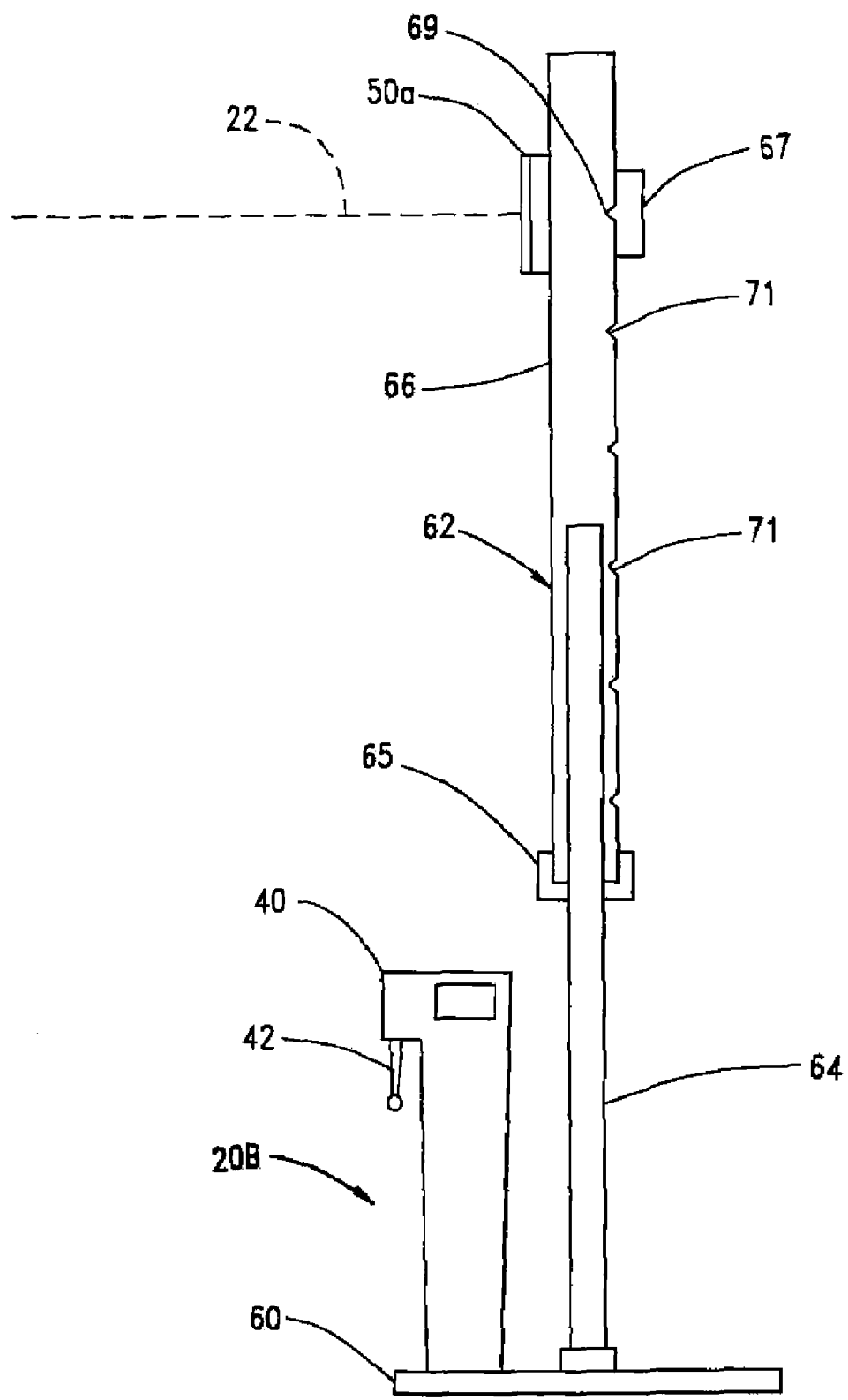
FIG. 2B is an alternative embodiment of the tracking receiver system shown in FIG. 2A. The tracking receiver system of FIG. 2B comprises photo detector array movable along an upper pole of the system.

With reference now to FIG. 2B, an alternative embodiment of the tracking receiver system 20 shown in FIG. 2A is illustrated therein. The tracking receiver system 20B of FIG. 2B comprises a tracker 40 supported on extendable frame 62. The extendable frame 62 comprises the base 60, the first member 64 connected to the base and the second member 66 operatively connected to the first member. The second member may comprise an upper pole adapted to move up or down relative to the first member 64. The clamp 65 is supported on the extendable flame to secure the second member 66 relative to the first member 64 to fix the height of reference line receiver 50a above the ground.

The reference line detector 50a shown in FIG. 2B comprises a photo detector array comprising a plurality of linearly arranged sensors sensitive to the wavelength of reference line 22 comprising a laser. The photo detector array 50a is supported to the upper pole 66a with a sliding clamp 67 having a locating tab 69 that limits the clamp to detent positions 71 along the upper pole 66a. The photo detector array 50a is capable of determining which sensor is impinged by the laser and determining the vertical distance between the sensor and the locating detent. Sensors and contacts (not shown) may be used to identify each detent and it corresponding position relative to the tracker 40. The distance between the impinged sensor and the contacted detent and the distance between the contacted detent and the tracker 40 are added to determine the height of the reference line 22 of the base of the tracker. It will be appreciated that the extendable frame 62 may also comprise a detent and sensor system to determine the relative position of the upper pole 66a and the lower pole 64. This measurement may then be included in the total distance measurement to provide a greater measurement range.

Figure 3:
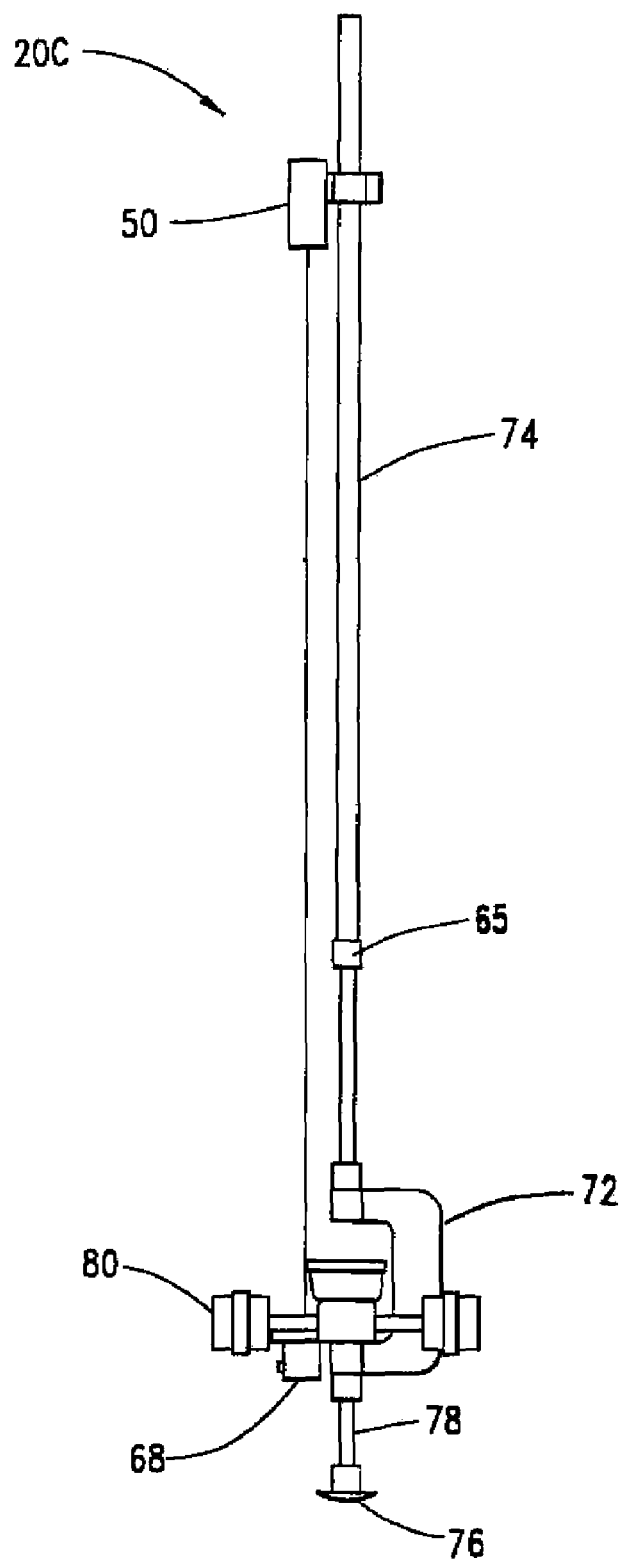
FIG. 3 is a diagrammatic representation of an alternative tracking receiver system of the present invention having an alternative sensor assembly supported on an extendable frame.

Referring now to FIG. 3, an alternative tracking receiver system 20C of the present invention is comprised of a bracket 72, or similar clamping arrangement, which couples an upper pole 74 and a foot 76 equipped lower pole 78 to an alternative tracker 80. For ease of use, the tracker 80 may mount rigidly to the bracket 72 and not move relative thereto.

Figure 4:
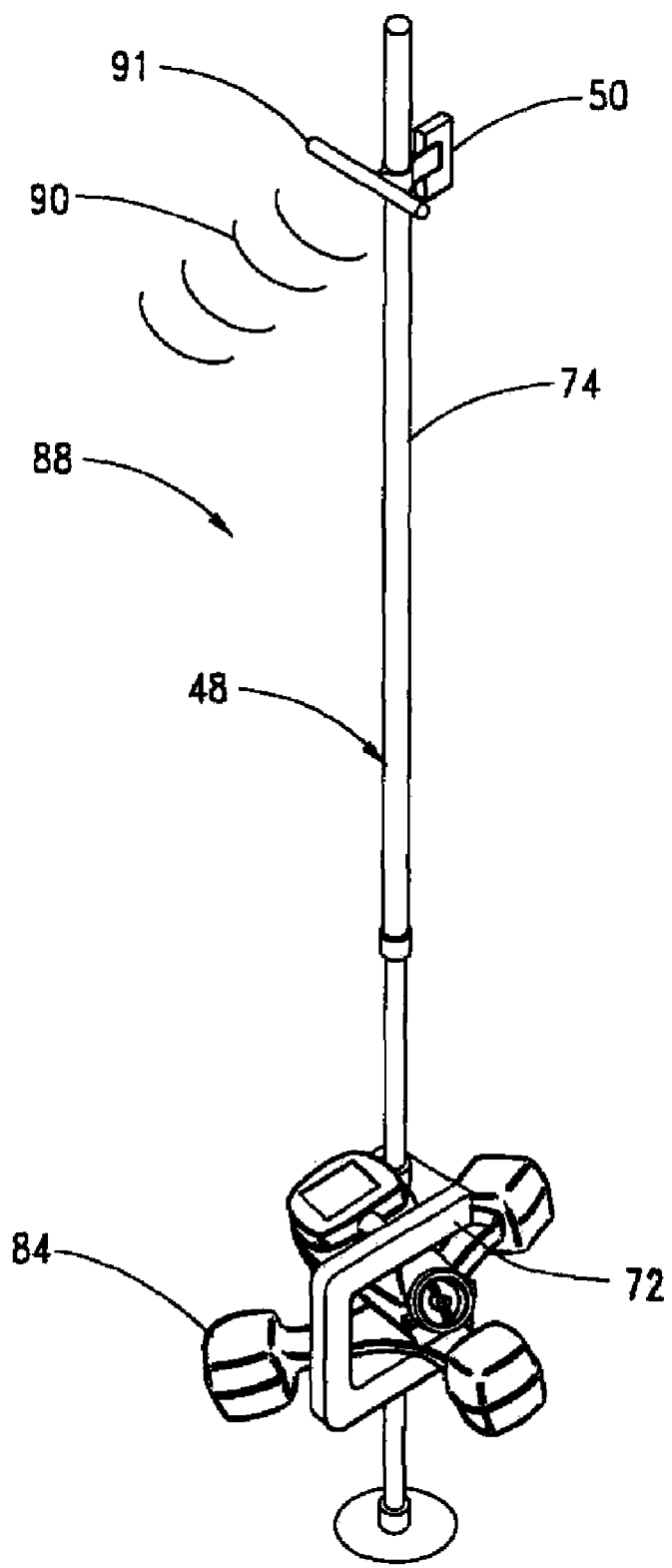
FIG. 4 is a diagrammatic representation of an alternative tracking receiver system of the present invention having a wireless device for measuring the distance between a laser receiver and a sensor assembly.

Turning now to FIG. 4, there is shown therein an alternative embodiment of the tracking receiver system of the present invention. The embodiment of FIG. 4 comprises a sensor assembly 84, a reference line receiver 50 supported above the sensor assembly by an extendable frame 48, and a means for measuring 88 the distance between the reference line receiver and the sensor assembly. The measuring means 88 of the embodiment shown in FIG. 4 comprises a dipole magnetic field transmitter 91 supported on the upper pole 74 and the sensor assembly 84 supported by a tracker 80. In operation, the dipole magnetic field transmitter 91 transmits a magnetic field 90 that may be detected by antennas of the sensor assembly 84. The magnetic field 90 transmitted from the transmitter 91 may be transmitted at a different frequency from the field transmitted from beacon 26 disposed within the boring tool 10. The detected signals are processed by the tracker 80 to in a conventional manner (most commonly from a calibrated relation with received magnetic field strength) to determine the distance between the reference line receiver 50, supported by the upper pole 74 and co-mounted with the transmitter 91, and the sensor assembly 84. This distance is stored in the tracker's 80 memory and later used to determine the distance from the reference line receiver 50 and the downhole tool 10 (FIG. 1).

Figure 5:
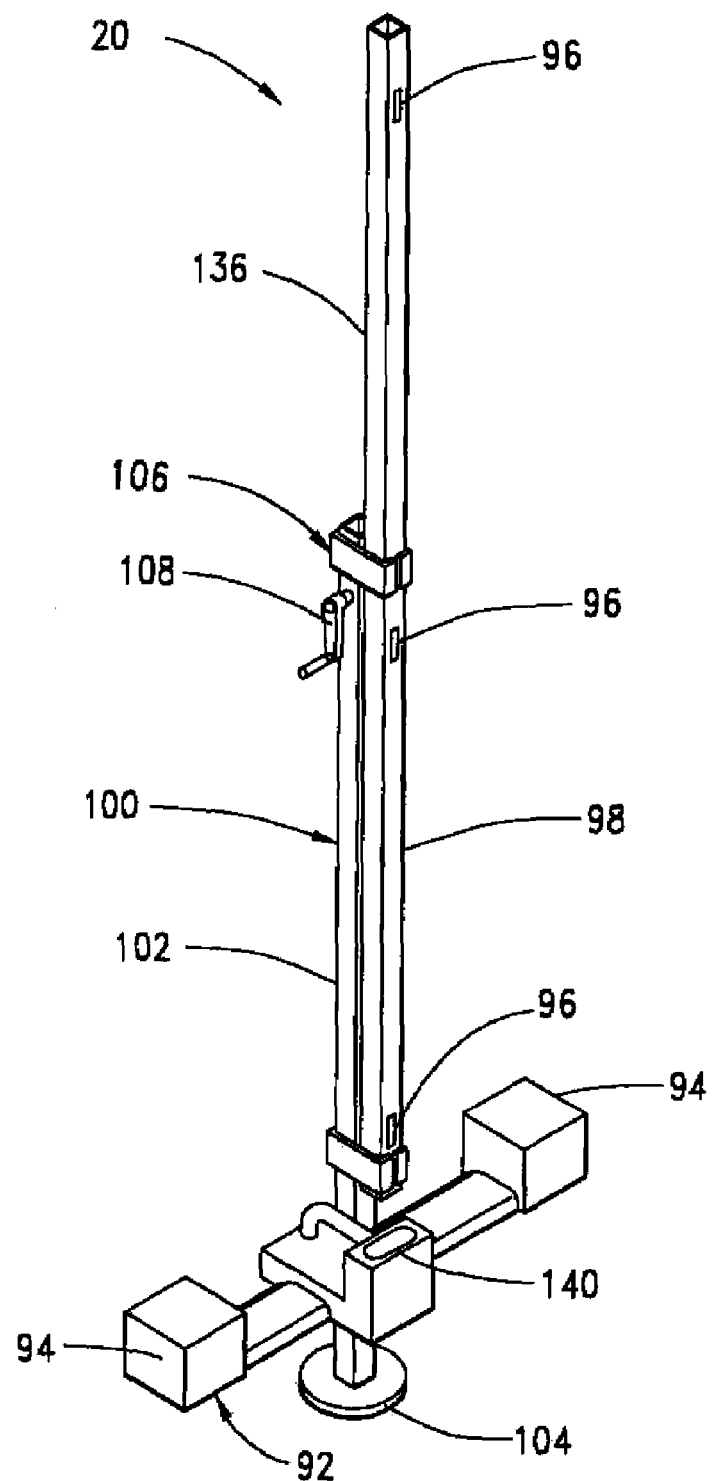
FIG. 5 is a perspective view of an alternative tracking receiver system of the present invention. The embodiment of FIG. 5 comprises a plurality of reference line detectors disposed along the length of an extendable frame.

With reference now to FIG. 5, there is shown a more detailed representation of the tracking receiver system illustrated in FIG. 1. The tracking receiver system 20 preferably comprises a sensor assembly 92 having a plurality of horizontally separated antenna arrays 94 for detecting signals from the beacon 26 (FIG. 1) and a plurality of reference line detectors 96 vertically spaced along the extendable frame 100. Alternatively, a sensor assembly with a single antenna array set may be utilized with the current invention. The antenna arrays 94 may each comprise a set of tri-axial antennas adapted to detect a magnetic field signal emitted from the beacon 26 (FIG. 1) and are supported by a lower pole 102 having a foot 104. The reference line detectors 96 may comprise photo detector arrays that are supported on or within the upper pole 98 or extension pole or poles 136 of the frame 100. A manually actuated device 106 may be supported on the frame 100 and adapted to move the upper pole 98 relative to the lower pole 102 to raise and lower the detectors 96.

Referring now to FIGS. 5 and 6, the manually actuated device 106 preferably comprises a rack 110 and pinion drive (not shown) driven by a crank handle 108. It will be appreciated that other means of moving the upper pole 98 with respect to lower pole 102 are possible. These may include manual sliding arrangements, screw drives, friction drives, or other means. In the present embodiment, the rack 110 is supported on the upper pole 98 and the crank handle 108 and driving pinion are supported on the lower pole 102. Actuating the crank handle 108 to drive pinion will cause the upper pole 98 to move up or down relative to the lower pole 102 depending on the direction in which the handle is rotated. A brake knob 112 may be used to lock the poles 98 and 102 relative to each other. An embedded magnetic strip 114 supported by the lower pole 102 and an embedded magnetic encoder sensor 116 may be supported by the upper pole 98 may be used to measure the position of the upper pole relative to the lower pole. Alternatively, a string potentiometer, various optical devices, rotary encoders on the handle 108, ultrasonic devices, or other means may be used to measure this relative displacement. This information may then be used, in manner yet to be described to determine the distance between the reference line detector 96 being impinged by the reference line 22 and the horizontal plane of the sensor assembly 92.

Figure 7:
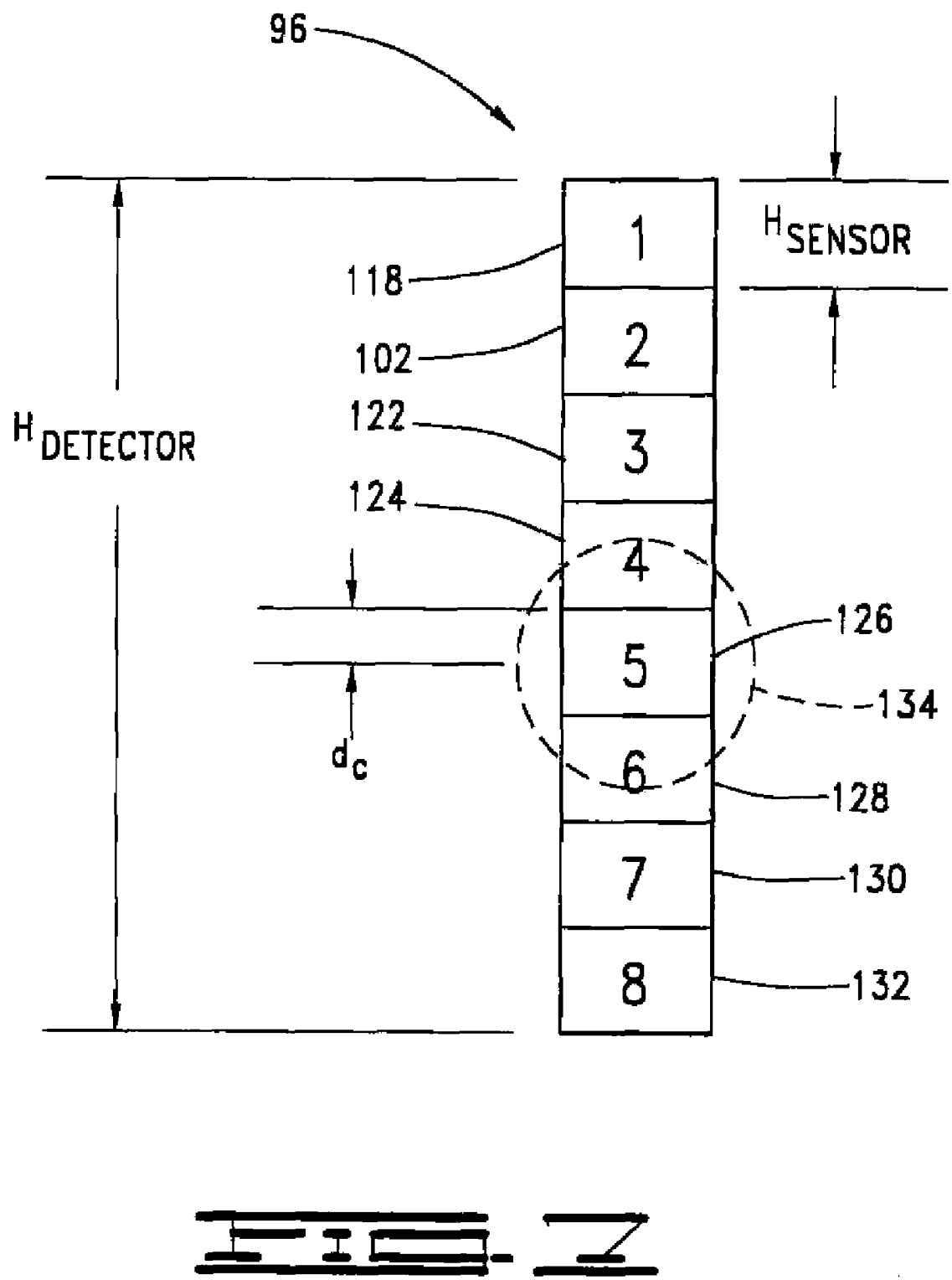
FIG. 7 is a diagrammatic representation of the reference line detector shown in FIG. 5. The reference line detector of FIG. 7 is shown comprising an array of photo detectors.

Turning now to FIG. 7, one of the reference line detectors 96 of FIG. 5 is shown in detail. The reference line detector 96 is comprised of a plurality of photodetecting sensors 118-132 arranged in a linear array having a height $H_{detector}$. Each sensor 118-132 has an individual height $H_{sensor}$. In the embodiment of FIG. 7 $H_{sensor}$ includes the height of the sensor 118-132 plus any vertical distance between adjacent sensors. Each sensor 118-132 produces an electrical current when impinged upon by a light of the appropriate wavelength, such as the of the reference line laser beam. Within a sensor there is no differentiation of the exact point of contact by the light. Transimpedance amplifiers associated with each sensor convert the current produced by the photodiode into a voltage. This voltage is fed into a comparator (not shown) where it is compared to a threshold voltage. The resulting discrete signal indicating whether the sensor has been illuminated is latched for later use. In FIG. 7, the sweeping spot of the reference line 22 is indicated by circular region 134. In this example sensors 4, 5, and 6 are illuminated by the reference line 22. Accordingly, the point of incidence of the reference line 22 is indicated by the center of the illuminated sensors. In this case, the center of the sensors illuminated would be the center of sensor 5.

One skilled in the art will appreciate other configurations of photo sensors such as a staggered pattern could also be used and could improve resolution. In the preferred embodiment, 8 photodiodes such as PDV-C173SM made by Advanced Photonix are used in each array, but the array could consist of any odd or even number of photo sensitive elements and could be constructed with different types of sensors such as photo transistors. The photo diodes used in the current embodiment are spaced such that $H_{sensor}$ is 4.25 mm. This arrangement provides a measurement resolution of ½* $H_{sensor}$=2.125 mm. The photodiodes used in the detectors 96 preferably have some type of optical filtering to limit the wavelengths of light impinging on them and reduce the amount of unwanted received ambient light. The combination of the photodiodes used and their optical filtering is intended to allow light wavelengths from 600 to 950 nm to pass. It should be obvious that the filters could be designed to favor different wavelengths to accommodate different light sources.

Figure 8A:
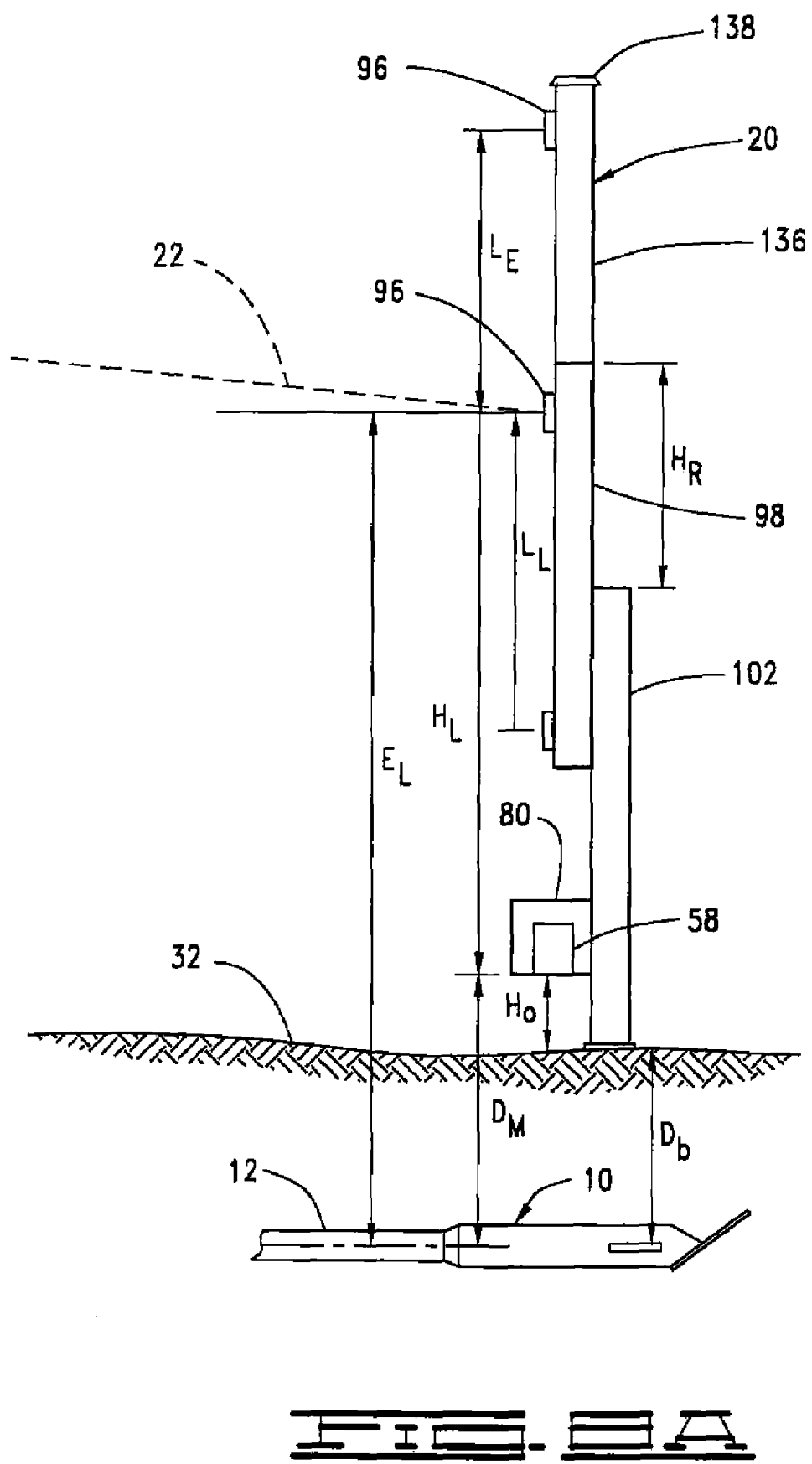
FIG. 8A is a diagrammatic representation of the tracking receiver system of FIG. 5 disposed above a downhole tool.

With reference now to FIG. 8A and as previously discussed reference line detectors 96 of tracking receiver system 20 may comprise multiple discrete microcontroller monitored laser detectors used in conjunction with the previously disclosed sliding frame arrangement to determine the vertical displacement $H_L$ of the reference line 22 above the tracking device. One skilled in the art will appreciate the detector may be monitored or controlled by digital or analog logic. The individual detectors 96 are supervised by a main microcontroller (not shown) which collects data from each detector and the encoder 116 (FIG. 6) and provides the operator interface. In the embodiment of FIG. 8A, two discrete detectors 96 are located in the upper pole 98 and one detector is located near the top of each extension pole 136. It will be appreciated that multiple detectors 96 may be placed on the upper pole 98 and/or on each extension pole 136. Use of extension poles 136 effectively adds length to the base survey pole. Each extension pole 136 has a mechanical connector and an electric plug (not shown) near the bottom for connection to the pole immediately below it and a receptacle for accepting the plug from the pole immediately above it. An additional cap piece 138 is used to terminate electrical connections and mechanically seal the topmost extension pole 136 or the upper base pole if no extension poles are in use. The cap 138 may also contain a constant current source used to generate reference voltages that identify different on-grade indications. A plug type electrical connector (not shown) may contain power, ground, an analog reference line with a constant current flowing through it, and one wire for the High, Low, and On Grade (analog) signals.

Referring now to both FIGS. 8A and 8B, vertical displacement from the sensor assembly 58 to the center of each detector 96 is known and may be denoted $H_{DX}$ where $X$ is the detector number. The magnetic strip encoder 116 (FIG. 6) is used to measure the relative displacement of the two poles $H_R$. While this is used in the present embodiment of the invention, it should be obvious that different types of encoders such as rotary, optical, or others could also be used. It is also obvious that various other types of measurement systems could be used to determine the distance $H_R$ such as ultrasonic, laser, or string potentiometer. $H_{DX}$ and $H_R$ can be added together to find $H_L$ when the reference line 22 is incident on the center of one of the detectors 96. Each detector 96 determines whether the laser beam is High, Low, or On Grade relative to the center of the detector and relays this information to a main microcontroller (not shown). The main microcontroller combines this data with the encoder data to determine the vertical displacement $H_L$ of the reference line above the sensor assembly. This information may be relayed by radio to the tracker for further use.

In operation and as shown in FIG. 8B, the operator 30 lowers the upper pole 98 to its minimum height and turns on the electronics. This establishes the zero reference for $H_R$ (FIG. 8A). In the current embodiment, an incremental encoder is used which would require a zero reference point. An absolute encoder may be used, however, to eliminate the need for this reference and simplify the setup procedure. The operator then adjusts the height of the upper pole 98 so that the approximate center of one of the detectors 96 is impinged by the reference line 22. This may be done by observing a set of three indicator LEDs (not shown). A yellow LED may indicate that the reference line 22 is high relative to the center of the detector; a red LED may indicate that the reference line is low relative to the center of the detector, and a green LED may indicate that the reference line is impinging the center of the detector 96. The LEDs will only turn on when one of the detectors 96 is receiving light from the reference line 22, thus there will be large ranges where the operator will see no indicator LEDs and will need to adjust the height of the upper pole 98 until one of the LEDs turns on. When the green LED is on, the operator can press a data request button (not shown) which, in the current embodiment of the invention, causes the main microcontroller to display $H_L$ on an LCD 140 or other display device (FIG. 5). It should be obvious that various other means of operator interface could be used in lieu of a pushbutton or LEDs. Though the preferred embodiment uses colored LEDs to indicate the position of the detector 96 relative to the laser plane, other means of operator interface could be employed including incandescent lamps, graphical displays, and audible tones. The operator interface could also be located in or integrated into the tracker or other device and operably connected to the survey pole electronics by radio or other means.

A processing algorithm may be used to determine whether the reference line 22 is impinging any of the detectors 96 and if so, whether the reference line is High, Low, or On-Grade with respect to the center of the detector. In order have a valid On-Grade indication; the entire reference line 22 spot should impinge upon the sensor array 96. Sensors 1 and 8, the top and bottom sensors of the array 96 respectively, should not be impinged by the reference line 22. If one or both of these outside sensors 96 were impinged upon by the reference line it would be difficult to determine the location of the center of the reference line 22 because part of the beam spot could be outside the detector. The microcontroller (not shown) first checks to see if sensor 1 was hit. If so, the incident laser beam is High. Similarly, if sensor 8 was hit, the beam is Low. The processing algorithm can then ignore sensors 1 and 8 in its remaining calculations.

A detection sum is then computed based on the detection sensors hit by the reference line 22. Sensor 2 is given a weight of 2, sensor 3 is given a weight of 4, sensor 4 is given a weight of 6, and the pattern continues until sensor 7 is given a weight of 12. The detection sum is computed by adding the weights of all of the sensors 96 that were hit. The detection sum is then divided by the number of sensors 96 hit to obtain the detection quotient used determine the location of the center of the incident reference line 22. The detection quotient indicates the location of the center of the incident reference line 22 in terms of the weights assigned to each sensor with a resolution of $\frac{1}{2}$ $H_{sensor}$. If the detection quotient matches any of the weighted sensor values, it indicates that the reference line 22 is centered on that sensor. A detection quotient between the weights of two sensors 96 indicated a reference line 22 centered between the two sensors.

An "On-Grade" indication is given if the detection quotient is 6, 7, or 8 indicating that the center of the reference line 22 is located at or below the center of sensor 4 and at or above the center of sensor 5. Using this method, the detector 96 is capable of determining the centers of reference line 22 beam spots of varying diameters. An On-Grade indication is possible for reference line 22 widths ranging from less than the height of a single sensor to the combined height of 6 sensors. For detection quotients less than 6, the reference line 22 is High with respect to the center of the detector, and a High indication is given. For detection quotients greater than 8, the reference line 22 is Low. The microcontroller then updates discrete outputs to indicate the position of the reference line 22 using positive logic for beam presence. The microcontroller waits an appropriate time period before scanning the latches. In the embodiment disclosed herein, the microcontroller waits 100 milliseconds before scanning the latches. This ensures that the reference line 22 sweeps past the detector 96 again. In this embodiment the reference line 22 comprises a rotating laser plane spinning at approximately 600 RPM. Laser planes spinning faster than 600 RPM will work well with the current program. For example, a laser plane spinning at 1800 RPM would sweep past the detector 3 times before the microcontroller read the latched data. Since the data is latched, data from all 3 sweeps would be logically ANDed together and processed by the microcontroller as usual. The program could be modified to handle laser planes rotating at lower speeds by increasing the delay time before reading the inputs and resetting the latches.

Referring still to FIGS. 8A and 8B, the main microcontroller collects data from the individual detector microcontrollers and the encoder 116 in order to determine $H_L$. During initialization, immediately after power-up, the number of encoder counts is zeroed as the survey pole is fully collapsed (FIG. 8B) before it is turned on. Other methods of zeroing the number of encoder counts could be employed and would be within the scope of this invention. For example, on power up, the encoder counts could be zeroed. Then any time the encoder count sum went negative, it would be reset to zero. In this way, the pole could be powered up at any height and then collapsed to its minimum height to zero the encoder count. Also during initialization, the encoder inputs are set up to generate interrupt requests to ensure that encoder pulses are given the highest priority. The microcontroller keeps track of the encoder counts using interrupt subroutines that effectively run in the background. The microcontroller begins the main program by polling the High and Low discrete signals and the On-Grade analog signal and updating the indicator LEDs accordingly. This process continues until the operator presses the data request button. At that time, the microcontroller checks that the On-Grade indication is present. If not present, an error message is displayed after which the user must press the data request button again to return to normal operation. If the On-Grade indication is present, the microcontroller then looks at the analog input voltage to determine which detector is sending the On-Grade signal. Then the distance $H_L$ is calculated by multiplying the number of encoder counts by a conversion factor to obtain a distance in units of the operator's choice, then adding $H_{DX}$ and finally adding a global offset that can be used to zero out the system. In the current embodiment, $H_L$ is then displayed on the LCD until the operator again presses the data request button. Program flow then returns to polling inputs and updating outputs until the data request button is pressed again.

Continuing with the embodiment of FIG. 8A, after the survey pole electronics relay the distance $H_L$ to the tracker or rig by RF or other means, the data could be presented to the operator in various ways. The vertical distance $E_L$ from the downhole tool 10 to the reference line 22 could simply be displayed for the operator 30 (FIG. 1) who would then make bore path corrections based on this number. Alternatively, a zero offset scheme could be implemented. In such a scheme the downhole tool 10 would be in the ground in the proper orientation at or near the starting pit 34, the reference line 22 would be set up at the appropriate grade, and the operator 30 would be directly above the downhole tool 10 with the tracking receiver system 20. The tracking receiver system operator 30 would then adjust the height of the upper pole 98 to locate the reference line 22 and then press a button or other interface on the tracker 80 or on the pole itself to trigger measurement of the target vertical distance $E_L$ of the reference line 22 above the downhole tool 10. The initial $E_L$ distance would be used as the target for the remainder of the bore. Grade drilling would then proceed until another depth measurement was taken. In this embodiment, a positive value would indicate that the downhole tool 10 was shallower than the desired bore path whereas a negative value would indicate that the downhole tool 10 was deeper than the desired bore path. The positive and negative conventions could also be reversed to make them more intuitive to the operator 30 of the HDD unit 28 (FIG. 1).

To determine the distance $E_L$ between the reference line 22 and the downhole tool 10, the downhole tool is located with the tracking receiver system 20 using known techniques. The depth of the downhole tool 10 from the tracker sensor assembly 58 is obtained using the sensor assembly and is represented by $D_M$. Either simultaneous with or sequentially with the determination of $D_M$, the distance $H_L$ between the reference line 22 and the sensor assembly 58 is determined as discussed above. Once $H_L$ has been determined by the electronics supported by the frame 100, this measurement is sent to the tracker 80. Transmission of information between the frame electronics and the tracker 80 may be via wired connection or a wireless link. Once $H_L$ and $D_M$ have been obtained by the tracker 80, they may be summed to determine the resultant elevation $E_L$.

In the present embodiment, the value $H_L$ is the sum of a number of quantities related to the construction of the tracking receiver system 20. This value, as shown in FIG. 8A, includes $H_{DX}$, the distance from the centerline of the detector 96 sensing the reference line to the base of the tracker 80 when the upper pole 98 is in the lowest position relative to the lower pole 102. The values of $L_L$ (the distance between detectors on the upper pole 98) and $L_E$ (the height of an extension pole 136) are both equal to one meter. Other convenient values such as one yard could also be used. It is not necessary that the values of $L_L$ and $L_E$ be equal, but is preferred. $H_L$ also includes the length of relative movement between the lower pole 102 and the upper pole 98 represented as $H_R$. This distance may be measured using the previously discussed embedded magnetic strip 114 and encoder 116.

In an alternative embodiment, the detector microcontrollers (not shown) may be programmed to locate the center of the incident laser beam and relay this data to the main microcontroller (not shown) via a serial communication or other means. In such an arrangement the distance between the center of the detector and the center of the incident laser beam could be referred to as $d_c$ (FIG. 7) and would, in the above case, be equivalent to ½ of the sensor height $H_{sensor}$. In this embodiment $H_L$ may include $H_{DX}$, $H_R$, and the correction value $d_c$ that accounts for the distance between the point at which the reference line 22 actually impinges upon the detector 96 and the centerline of the detector.

With reference now to FIGS. 1 and 8A, use of the tracking receiver system 20 to monitor the depth of the downhole tool 10 will be discussed. Using the tracking receiver system 20 of the present invention a target distance or elevation, $E_{LO}$, between the reference line 22 and the downhole tool 10 is established at or near the edge of the starting pit 34, or at the beginning of the on-grade section of the bore 24 if no starting pit is utilized. The target distance, $E_{LO}$, is acquired by locating the position of the downhole tool 10 in the horizontal plane using the sensor assembly 92. The sensor assembly 92 is preferably located directly above the beacon 26 in the downhole tool 10, but when using the sensor assembly 92 of FIGS. 1 and 8A comprising multiple antenna arrays 94 the tracking receiver system may be laterally offset from the borepath and still obtain a valid reading. The foot 104 of the lower pole 102 is then placed on the ground 32 and the upper pole 98 is raised or lowered until the center of the detector 96 is impinged by the laser beam 22 in a manner previously described. At this point a reading is taken with the sensor assembly 92 to measure the depth of the downhole tool 10 below the sensor assembly. Either sequentially or simultaneously with the measurement of the depth of the downhole tool 10, the height $H_L$ of the reference line 22 above the sensor assembly 92 is determined as previously described. Since the reference line 22 is substantially parallel to the intended on-grade path 24 of the downhole tool 10, the object is to hold subsequently measured distances $E_{Li}$ substantially equal to the reference distance $E_{L0}$ throughout the on-grade bore.

At each of several tracking locations 36 or stations along the desired path 24 of the bore, the foot 104 of the tracking receiver system 20 is placed on the ground surface and the extendable frame 100 is adjusted until the center of the detector 96 is impinged by the reference line 22 as determined in a manner previously described. The data request button (not shown) of the tracking receiving system 20 is pushed to obtain a reading of the depth, $D_M$, of the downhole tool 10 below the sensor assembly 92 and to obtain the height $H_L$ of the reference line 22 above the sensor assembly. Having obtained these two values, the total distance $E_{Li}$ of the reference line 22 above the downhole tool 10 may be calculated. The value of $E_{Li}$ may be compared to the reference reading $E_{L0}$ to determine the need, if any, of a steering correction. However, provisions are present in some tracking receiver systems or remote displays 46 allowing depth readings to be sequentially recorded into memory. These values may be recalled from memory to aid in the comparison. Additionally, a processor may compare the latest distance reading with the initial reading and determine whether the bore is progressing within the specified grade design tolerance. If out of tolerance, audible warnings could be generated or a stop command (plus additional commands) sent to the automated control system 46 that may have operational control of the drill unit 28. It will be appreciated that any of the embodiments of this disclosure may be used in a similar manner to guide the on-grade bore. Each would employ the unique features of that embodiment to provide the operator with a single value to compare to an initial target value to determine whether or not the bore is progressing on-grade.

A bubble level or other level measurement device (not shown) may be incorporated into the tracking receiver systems disclosed herein to aid the operator 30 in holding the tracking receiver system vertical, or plumb, as the reading is being taken. The bubble level or plumb indicating device may be incorporated as a virtual "bubble level" into the display 140 on the tracker 80, or may comprise a physical device mounted on tracking receiver system. When the bore is performed in this fashion, each elevation reading should be substantially the same as the target reading $E_{L0}$ measured at the start of the on-grade section of the bore 24. With this information, the drilling unit operator or tracker operator 30 may quickly discover any deviation from the desired grade and determine what sort of directional correction is needed to return the bore to desired grade.

The method and apparatus of the present invention eliminates the need to shoot a topographic map of the bore operation area before beginning the operation. Topographic mapping of an area using prior art tracking devices is inadequate because local anomalies as small as rodent mounds or wheel ruts in the surface of the ground can cause erroneous topography-based depth readings. The method and apparatus of the present invention resolves this issue because depth measurements are taken each time with reference to the stable laser beam 22.

While the implementation of this method discussed above includes the use of a laser plane established on-grade, it is also conceived that other means could be used to accomplish the same task. For example, an optical transit could be established near the start of the bore in place of the laser line generator 18. The optical transit would have to be adjusted such that the line of site in the direction parallel to the desired bore path 24 was at the desired grade of the bore. This method would be particularly suited for use with the devices of FIGS. 2, 3, 4, and 14. A simple optical target could then be mounted on the extendable frame 62 (as shown in FIG. 2, or its equivalent in the alternate figures) in place of the reference line receiver 50. One worker could sight through the transit and provide indication to the operator 30 when the frame of the tracking receiver system is properly adjusted instead of relying on audible or visual signals from the laser receiver for this information. Once the optical target was at the correct level, a depth reading of the boring tool 10 could be taken along with the elevation of the optical target with respect to the tracker and that combined reading compared to the target depth established at the start of the bore.

In cases where the line of sight between the reference line generator 18 and the reference line receiver 50 is obstructed, the reference line generator may be laterally offset from the directional heading of the desired borepath 24 or laterally offset along the desired borepath beyond the starting pit 34. The inclination of the rotating laser beam 22 plane may be set equal to the desired grade of the bore in the direction parallel to the desired bore path, and set horizontal (0% grade) in the direction perpendicular to the direction of the desired bore path in these instances. Alternately, a tracker 80 (FIG. 3) that allows depth readings to be obtained without having the tracker positioned directly above the downhole tool 10 may be utilized in the tracking receiver system. This type of tracker 80 can be moved laterally off the intended alignment of the borepath to the point where the obstruction no longer shields the laser beam 22.

Comparing downhole tool 10 position and heading information obtained by the tracking receiver systems of the present invention to the desired path 24 determines whether a steering correction is necessary and, if so, its proper direction. If a steering correction is not needed, the downhole tool 10 is advanced with rotation. Typical directional downhole tools 10 are generally advanced with rotation to counteract its directional features of the boring tool to continue on its present heading.

When using the present method, if the indicated depth of the beacon deviates from the target depth, the operator of the rig should not base his steering correction solely on getting back to the target depth for the bore. When boring at a negative grade (downhill), correcting a "deep" reading too rapidly can result in a dip in the bore path. Conversely, when boring at a positive grade (uphill), correcting a shallow reading too quickly may also result in a dip in the bore path. Instead, in these circumstances, when the deviated reading is encountered, the pitch at which the boring tool is advanced should be slightly altered in the required direction. In doing so, the depth will gradually be brought back to the target value without creating a low spot, or dip, in the bore path. The key is that when the desired bore path lies on a negative grade, the pitch at which the head is advanced should not be allowed to go positive. When the desired bore path lies on a positive grade, the pitch at which the head is advanced should not be allowed to go negative.

Because it may be difficult for the operator 30 to monitor and mentally average displayed pitch readings "on the fly" and visually detect any subtle change when the beacon 26 and its pitch sensor are being rotated as fast as 150 to 250 revolutions/minute in the straight drilling mode. This factor, coupled with vibratory effects from a rotating downhole tool 10 can contribute toward sporadic false pitch readings. Commercially available beacons such as the Subsite® 86BG grade beacon are able to discern slow rotation to orient the boring tool for a steering correction when they are being rotated at drilling speeds. Thus, when high-speed rotation is detected the beacon's processor (not shown) is programmed to drop other data streams and transmit essentially only averaged pitch sensor readings. U.S. Pat. No. 5,703,484 issued to Bieberdorf, et. al. the contents of which are incorporated by reference herein, discloses a beacon processor utilized to "average" samples of pitch data before transmission. Averaged pitch values can then be sent at the throughput capacity of the amplitude or frequency modulation techniques being applied to the carrier frequency transmitted by the beacon.

Turning now to FIG. 9, an alternative embodiment of the tracking receiver system of the present invention is shown therein. The tracking receiver system 20D comprises a frame 200 having an upper pole 202 and a lower pole 204. The upper pole 202 supports a sensor assembly 206. The sensor assembly 206 may comprise a lower housing 208 and an upper housing 210, but other form factors for the sensor assembly may be used. The lower housing 208 may be adapted to support an antenna assembly adapted to detect signals transmitted from beacon 26 (FIG. 1). The upper housing 210 may comprise a handle 212 and a display (not shown). Further, a wireless communication system 214 may be supported by the upper housing 210. The sensor assembly 206 is supported on the frame 200 using a bracket 216 that is adapted to allow movement of the upper pole 202 and the sensor assembly 206 relative to the lower pole 204. The bracket 216 may comprise a clamp device (not shown) to lock the position of the upper pole 202 and sensor assembly 206 relative to the lower pole 204 while readings are taken. A reference line receiver 50 may also be supported on the upper pole 202 of the frame 200.

In operation, the tracking receiver system 20D is used to locate the downhole tool 10 along the desired subsurface path. Once the downhole tool 10 is located, the upper pole 202 and sensor assembly 206 are raised or lowered until the reference line receiver 50 is impinged by the reference line 22 (FIG. 1). It will be appreciated that the distance between reference line receiver 50 and the antenna assembly in housing 208 will remain substantially constant as the upper pole 202 and sensor assembly 206 are adjusted relative to lower pole 204. An LED or other visual indicator may be used to indicate to the operator that the reference line receiver is being impinged by the reference line. Once the reference line receiver is being impinged by the reference line, a depth measurement may be taken by the sensor assembly 206 and displayed on the display (not shown) of the upper housing 210. In using this device, a target depth is obtained at or near the start of the on-grade portion of the bore. The depth measured by the sensor assembly 206 at any point along the on-grade section of the bore is then compared to the target depth to determine of the downhole tool 10 is proceeding along the desired subsurface path at the desired grade. It will be appreciated that to allow this system to handle larger changes in elevation along the bore, extension poles (not shown) of known length may be added on top of upper pole 202 and reference line receiver 50 moved to a known position near the top of each extension pole. When an extension pole is added to the system, the target depth must be adjusted by subtracting the length of each extension pole from the original target depth. When using the device of FIG. 9, the only required measurement at each location point is the depth of the downhole tool relative to the sensor assembly 206. It is unnecessary to obtain a separate reading of distance from the reference line receiver 50 to the sensor assembly 206 as this distance will remain constant unless altered by the inclusion of extension poles as previously discussed.

Figure 10:
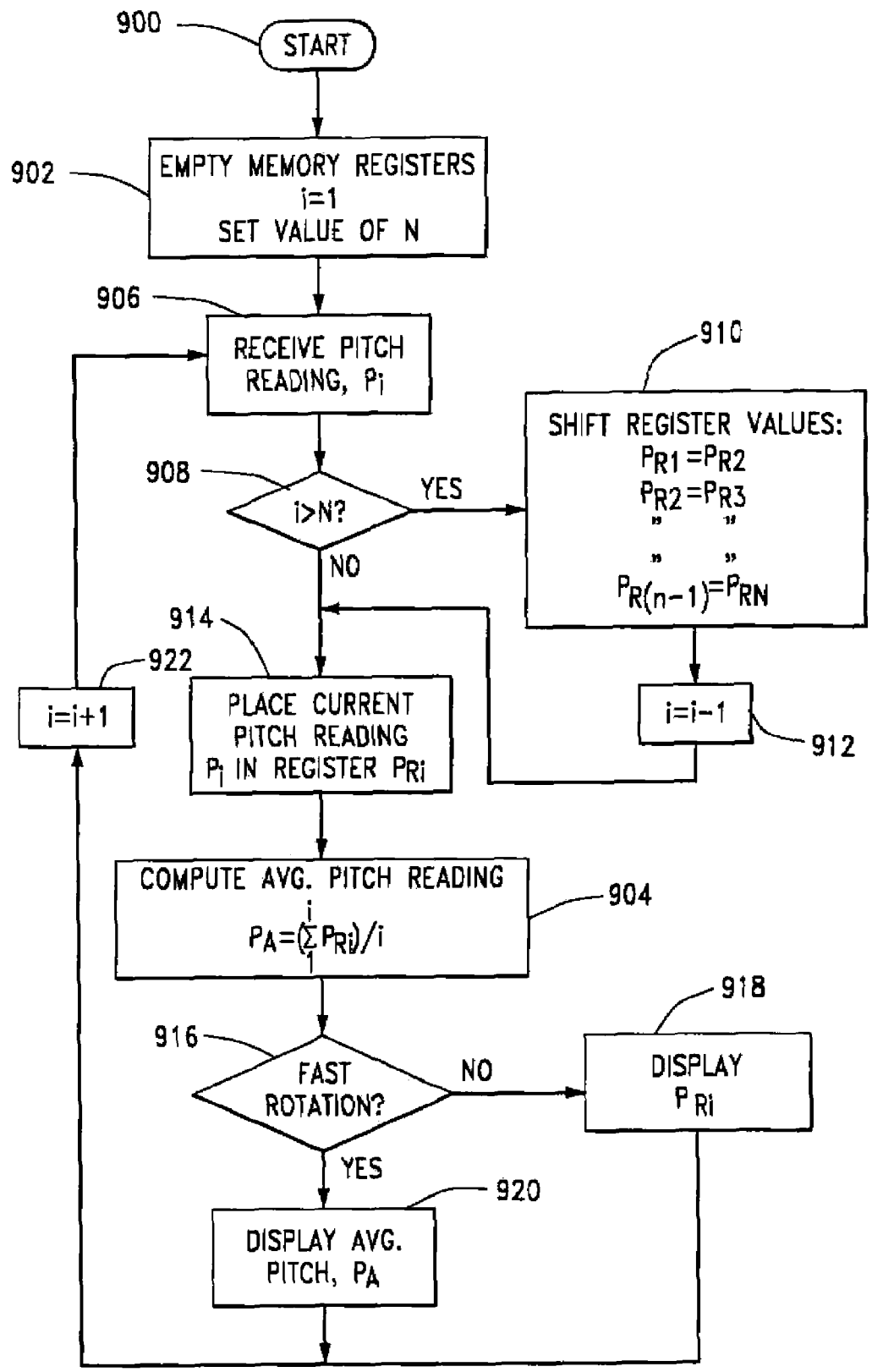
FIG. 10 is a flow chart illustrating a corrective averaging process to aid in comparing the directional downhole tool pitch to the desired installation grade.

With reference now to FIG. 10, shown therein is a basic flow chart for implementing additional averaging of the beacon's pitch readings $P_i$. This subroutine would be called upon at Start 900 when the downhole tool 10 enters the on-grade segment (FIG. 1) of the bore 24. At step 902, the memory registers are cleared, the counter i is set equal to the integer one, and the operator chooses a maximum value N for this counter. This determines the maximum number of sequential pitch readings $P_i$ that will be stored in a First-In-First-Out (FIFO) memory for averaging at step 904. This will be an average of averages. The value of N may be directly entered utilizing the existing keys or keypad (not shown) on the tracking receiver system 20. Its value may be adjusted as necessary to reflect current soil conditions and/or drilling parameters. The initial setting may be determined by experimentation or estimated as in the following example:

Typical Drilling Rate (for critical on-grade bores)≦3 ft/min

Threshold Increment (TI) for Pitch Updates=0.5 foot (Maximum straight drilling interval over which the pitch readings are to be averaged.)

Thus≦6 Pitch Updates/minute is sufficient

Present Interval between Pitch Updates=1 second=60/min

In this case, at least N=10 pitch readings $P_i$ would be sequentially collected at step 906 and stored in memory. The average pitch $P_A$ is recalculated every time a new pitch reading $P_i$ is stored. Once every register $P_{Ri}$ of the memory has been filled with readings, the average pitch $P_A$ relates to the last 0.5-foot drilled. That is, there will be some "settling" of the readings $P_A$ until the counter i=N. In the event i>N (Step 908) the register values are shifted at Step 912 by decreasing the counter i by one (1), now equal to N, which allows the newest pitch reading $P_i$ to be stored as $P_{RN}$. After reduction of the counter (Step 912), the current pitch reading Pi is placed in register $P_{Ri}$ at Step 914.

Next, the average pitch $P_A$ is calculated at Step 904. The processor then decides at Step 916 which pitch value to display based upon fast rotation of the downhole tool 10. If the downhole tool 10 is not being rotated fast the pitch $P_{Ri}$ is displayed at Step 918. In the event the downhole tool 10 is rotating fast the average pitch is displayed at Step 920. At Step 922 the counter i is incremented and pitch is again read at 906.

The filled memory is kept current on a FIFO basis by the fact that i=N is increased to i=N+1. The register values (stored sequential pitch values) $P_{Ri}$ for i=1 to N are shifted downward by one increment, causing the oldest one to be deleted. The displayed pitch ($P_i$ or $P_A$) has been tailored to meet the differing needs of the two primary drilling modes (i.e., corrective steering or straight drilling). Step 916 automatically causes the displayed pitch be the one best suited for the present mode.

The '484 Bieberdorf patent says that the tracking receiver decodes the pitch angle information transmitted by the beacon 26 and could utilize that information to automatically control the directional downhole tool 10 to correct or maintain a given pitch angle. Control logic and a suitable machine control system are disclosed in U.S. Patent Application Publication No. 2004/0028476, the contents of which are incorporated herein by reference. The disclosed machine control system can automatically control operation of the drill unit 28 while guiding the downhole tool 10 along a selected borepath segment 24. This is accomplished via tracking and guidance control systems that obtain and utilize data indicative of the position and orientation of the downhole tool 10 along with other data from the operation of the drill unit 28. For instance once at the target depth $d_0$ of the on-grade bore segment 24, the guidance control circuitry advances the downhole tool 10 in a straight line. The tracking circuitry monitors the location and orientation of the downhole tool 10 and boring tool, communicating the information to the main control circuit. The information received from the tracking circuitry is documented to record the path of the borehole as it is being bored. The location and orientation of the downhole tool 10 can then be compared to the desired borepath 24. When the downhole tool 10 veers from the intended borepath 24 (or when a new segment of the borepath calls for a change in direction), the guidance control circuitry will operate to change the direction of the downhole tool 10, guiding the downhole tool 10 along or back to the intended borepath.

Reactionary movement of the drill unit 28 is sensed and compensated for (e.g., when making drill string in-ground length calculations). Position and movement of the carriage 142 is also sensed. Such sensing devices and method are disclosed in U.S. Pat. No. 6,550,547 by Payne, et al., the contents of which are incorporated herein by reference. Forward movement of the carriage 142 thrusts the drill string 12 through the earth 32. The operation of the carriage thrust motor (not shown) can be correlated to the movement of the carriage 142 using a speed pickup sensor to count magnetic pulses from the revolving motor output shaft. An additional sensor or switch is used to indicate when the carriage 142 has passed a "home" position. The magnetic pulses counted from the motor can then be used to determine how far the carriage 142 has traveled from the home position and what direction it is currently traveling. It will be appreciated that other means of determining carriage position and travel exist including string potentiometers and magnetic pickups sensing rack teeth or fixed magnetic strips. Whenever drilling is in progress, forward motion of the carriage 142, corrected by any reactionary movement of the drill unit 28, can be utilized to approximate the forward travel of the downhole tool 10. Alternatively, when a tracking receiver system of the type disclosed in U.S. Patent Application No. 60/680,780 is utilized, sequential coordinate measurements of changing beacon position may be directly converted into downhole tool 10 forward travel.

Figure 11:
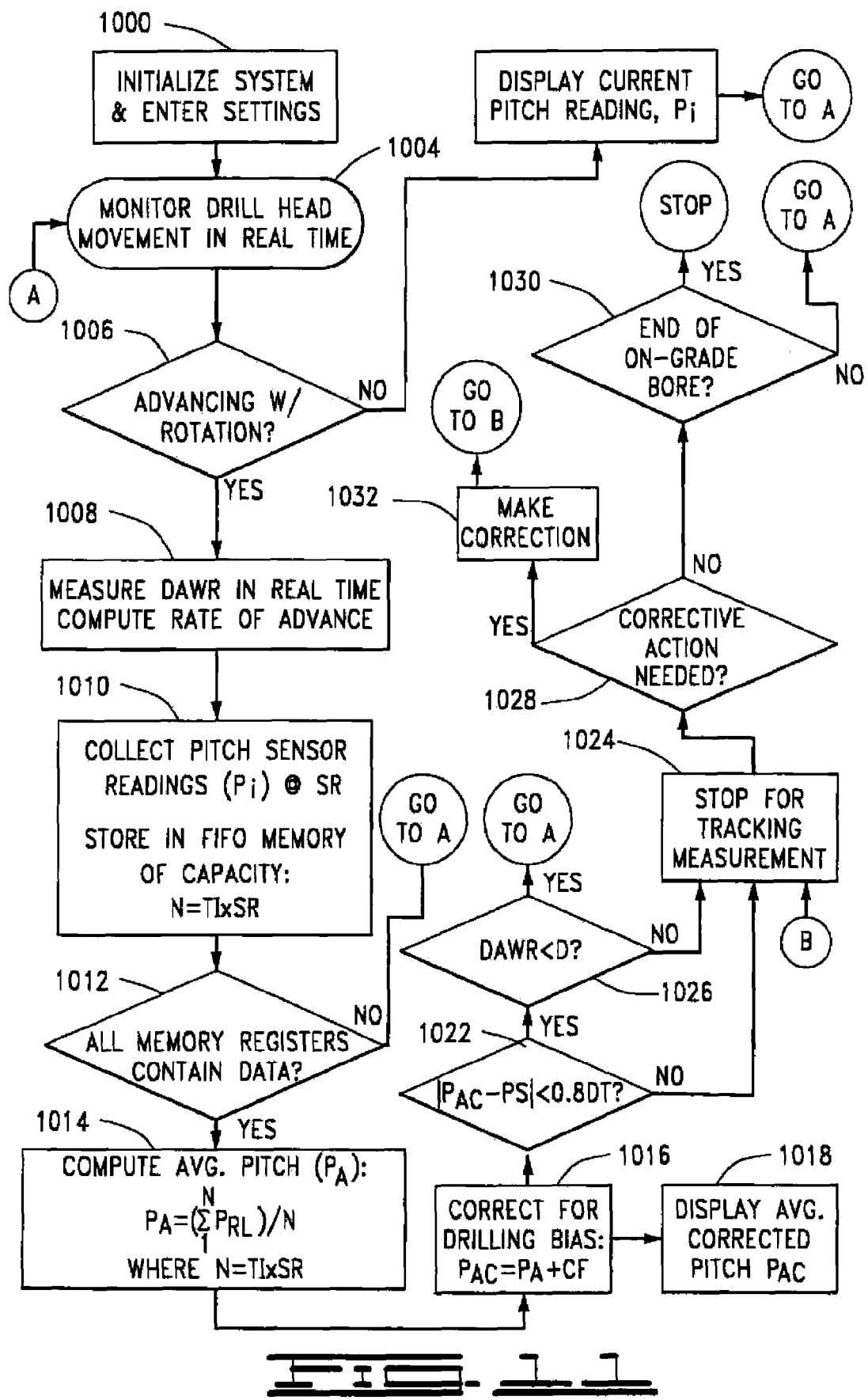
FIG. 11 is a flow chart illustrating the adaptation of the process shown in FIG. 10 for automated control of the on-grade boring process.

The automated drilling methods described above can be adapted to close-tolerance on-grade applications by way of some enhancements to the flow diagram of FIG. 10. One approach to automate its averaging process is shown in FIG. 11. One skilled in the art could readily incorporate the principles disclosed in this flow diagram into the disclosure of U.S. Patent Application Publication No. 2004/0028476.

With reference now to FIG. 11, a method for automated drilling and backreaming of an on-grade borehole is shown. At Step 1000 the system is initialized and certain settings are entered. These settings may include: (1) the distance to advance with rotation "DAWR", (2) purge prior pitch readings from memory, (3) threshold increment "TI" to 0.5 or 1.0 feet, (4) sampling rate "SR" to acquire the desired pitch reading per foot of advance, (5) the desired grade "PS" in % grade, (6) the design tolerance "DT" of the desired grade, (7) the correction factor "CF" anticipated to be added to a pitch reading, and (8) the preferred or anticipated maximum distance D between tracking stations 36 (FIG. 1). Input of this information may be completed prior to beginning the bore, or before embarking on the on-grade segment. The program is active any time automatic guidance is employed. At step 1004, the downhole tool 10 is continuously monitored for forward movement and presence or absence of rotation. Monitoring may be accomplished via techniques described above, or by utilizing tracking receivers known in the field. Steps 1006 through 1018 are essentially equivalent to the flow chart of FIG. 10.

When the condition at step 1006 is not satisfied, the most recently received pitch reading $P_i$ is displayed at step 1020. This provides a more responsive pitch indication whenever the downhole tool 10 advances without rotation in the steering mode. If the condition at step 1006 is satisfied, the Distance Advanced With Rotation (DAWR) is measured with respect to time and converted into essentially real time Drilling Rate (DR) at step 1008. A changing DR can be applied to adjust a normally time-based sampling of pitch readings in the beacon to the distance-based Sampling Rate (SR) utilized at Step 1010. For instance, this may be accomplished by varying the clock speed of the beacon's Analog to Digital Converter (ADC). The pitch readings $P_i$ are stored in a FIFO memory of capacity determined by the multiplication of the Threshold Increment (TI) for Pitch Updates by the sampling rate SR. One difference from FIG. 10 is that the stored pitch readings $P_i$ are not averaged at step 1014 until step 1012 indicates all memory registers have been filled with readings. This removes display settling time. The operator is not left long without being given the first averaged pitch reading and subsequent updates follow quickly as described earlier.

Since the beacon pitch readings and the actual slope of the borepath may not match exactly due to calibration inaccuracies or "drop" of the drill head due to the action of gravity as the drill head rotates, at step 1016 a Correction Factor (CF) is applied to the average pitch $P_A$ to account for the difference between beacon pitch readings and actual slope of the borepath. The corrected average pitch $P_{AC}$ is displayed at 1018 and compared to the specified grade or pitch PS at step 1022. The absolute value of their difference is calculated for comparison with the more stringent of the ± tolerance band placed on PS (entered as a positive number in either case). In this instance an 80% factor has been applied so that the tolerance is not exceeded before straight drilling is stopped at Step 1024 for a confirming measurement of downhole tool 10 position and orientation. So long as the condition in step 1022 is true, advancing with downhole tool 10 rotation (i.e., straight drilling) will continue until the next planned tracking station 36 is reached—as determined by the logic in step 1026.

The measurement at Step 1024 and need for corrective action at Step 1028 is determined by one of the on-grade tracking systems of the present invention comparing the measurement to the pre-planned desired path 24. If no correction is needed, the straight drilling loop continues to the end of the on-grade segment of the bore is reached at Step 1030. If need of corrective steering is indicated at Step 1028, the correction 1032 may be implemented in accordance with the teachings of U.S. Patent Application Publication No. 2004/0028476.

When a correction in heading is required with typical HDD drill units 28, the directional downhole tool 10 is rotated to the proper tool-face heading (i.e., roll position). The drill string 12 is then thrust forward by advancing carriage 142 without rotation of the drill string. The directional downhole tool 10 deflects off its previous course heading as it engages virgin soil beyond the point where rotational advance ceased. An opposite steering action may needed (especially for lateral direction corrections) before the downhole tool 10 fully returns to the desired path, otherwise overshoot is likely to occur and the actual borepath will tend to zigzag around the desired path—a potentially unacceptable situation for close-tolerance installations of products such as gravity flow drainage pipes. This circumstance can be greatly mitigated (or potentially avoided) by closely spacing the tracking stations 36 (FIG. 1)—which is more practical with the tracking receiver systems of the present invention. Once deviation is detected, borepath planning algorithms such as described in the previously referenced U.S. patent application Ser. No. 10/404,550 "Automatic Path Generation and Correction System" may be adapted to provide steering recommendations that will direct the downhole tool 10 back onto the desired path. This can be accomplished, for instance, by inputting multiple "critical points" that lay on the remaining (to be drilled) portion of the intended path 24.

Referring now to FIG. 12, an alternate embodiment of the present invention is illustrated. In the embodiment of FIG. 12, a laser-based robotic total station survey instrument 144 (such as the Topcon GPT-8200 series or their GTS-820A) and a prism or target 146 to reflect a distance measurement signal from survey instrument 144 along line of sight 148. This reflector 146 may be attached to a conventional tracker 40 at a fixed height and orientation such that it is within the line of sight 148 of the total station when the tracker is properly positioned for obtaining a depth reading. One skilled in the art will appreciate that a standard, manually sighted survey station such as the Topcon GTS-230 Total Station could be utilized. However, robotic survey stations which can automatically track a target in the field are particularly well suited for this application.

At the starting pit 34, the survey station 144 determines an initial horizontal range $R_0$ and vertical declination $D_0$ (or elevation) of the tracker receiver system 20E relative to the instrument height of the survey station 144, designated in FIG. 12 as the Reference Elevation. The convention used in equations 1-4 assumes that values of Do which lie above the Reference Elevation will be positive values and values of Do which fall below the Reference Elevation will be negative values. Since the position of the reflector 146 on the tracking receiver system 20E is fixed, the vertical distance from this target to the bottom surface of the tracking receiver system—designated as $h_F$—will remain constant. As above, the depth of the downhole tool 10 below the bottom of the tracking receiver system 20E is measured using traditional techniques. At the starting location this depth may be designated as $d_0$. Having obtained the values of $D_0$, $h_F$, and $d_0$, the initial elevation $E_{H0}$ of the downhole tool 10 may be calculated by the equation:

$$E_{H0}=D_0-(h_F+d_0) \quad \text{(Eq. 1)}$$

Its subsequent elevations $E_{Hi}$ along the on-grade portion of the bore are obtained at appropriately spaced monitoring stations $36_i$ where the total station 144 each time is used to acquire the horizontal range $R_i$ and declination/elevation $D_i$ of the tracking receiver system 20E.

$$E_{Hi}=D_i-(h_F+d_i) \quad \text{(Eq. 2)}$$

As the bore progresses, it will be desired to maintain the downhole tool 10 on the specified or target grade $g_T$, which may be either up (+) or down (−) depending on the desired flow direction of the installed pipe. For each range $R_i$, along the borepath, there will be a target elevation $D_{Ti}$ for the downhole tool 10 relative to the Reference Elevation that should be maintained to assure the bore is on-grade. This target elevation $D_{Ti}$ may be calculated at a given point along the borepath by the following equation:

$$D_{Ti}=E_{H0}+g_T(R_i-R_0) \quad \text{(Eq. 3)}$$

Once the target elevation for the downhole tool 10 $D_{Ti}$ and the actual elevation of the downhole tool 10 $E_{Hi}$ are known at a given point along the bore, an error term representing any deviation in elevation from desired grade is calculated by the equation:

$$\text{Error}=E_{Hi}-D_{Ti} \quad \text{(Eq. 4)}$$

If the error term is negative, the actual elevation of the downhole tool 10 is below the target elevation. Thus the downhole tool 10 will need to be steered up to maintain grade (return to the specified grade). If the error term is positive, the downhole tool 10 will need to be steered down to maintain grade.

The use of the total station shown in FIG. 12 eliminates the need to shoot a detailed pre-bore topographic map of the area where the bore will occur. By relating all measurements to the Reference Elevation of the instrument 144, the system negates the effect of topography variations on the depth measurement $d_i$ at the time measurements are taken for each monitoring station $36_i$.

Total station survey instruments have left-right angular (Horizontal Angle) measurement capability, which may be used to measure deviation of the downhole tool 10 from the desired boring azimuth (i.e., via measuring the position of the tracking receiver 130 overhead). When the instrument 144 is set up such that its "north" or zero azimuth direction coincides with the bore alignment (assuming a straight left-right alignment is specified), the coordinates outputted for each measurement station 36 will directly indicate any left-right deviation. Where a horizontal curvature is specified in the bore alignment, one skilled in the art of surveying could readily derive equations similar to those above to arrive at a lateral error term. In this case, an additional survey point over the intended path would have to be taken wherever the downhole tool 10 is found to have drifted laterally away. Although data reduction would involve more arithmetic, the total station 144 could be set up displaced from its preferred position in order to circumvent obstacles that obscure line of sight to the reflector 146.

Many total stations are capable of wireless transmission 150 of the range and declination information they obtain for the target 146. This information may be relayed to the tracking receiver system 20E so the calculations in the above equations can be performed there to provide an immediate display of the error term to the receiver operator 30. Alternatively, the range and declination information from the total station 144 may be received at the drill unit 28 along with downhole tool 10 depth information $d_i$ from the tracker 40, and the processing of the error term done by the receiving unit 46 (FIG. 1) at the drill unit. In either case, the information needed to correctly guide the bore on-grade is provided to crewmembers. Information such as target elevation $D_{Ti}$ of the downhole tool 10 (or a calculation of its target depth), left/right deviation, and actual elevation $E_{Hi}$ of the downhole tool (or its measured depth $d_i$) may be directly entered into a bore mapping program such as the Subsite® Track Management System (TMS) for creation of an as-built map of the bore in profile view and overhead view.

Alternatively, it is conceived the position of the survey instrumentation and the fixed target could be switched. Instrumentation providing a precision inclinometer and range finder at the tracker could be used to generate a similar result to the scenario depicted in FIG. 12. In this case a fixed target would be placed near the start of the bore, and the instrumentation at the tracker could shoot to the fixed target with every locate point to establish range and elevation of the new point. However, there are practical difficulties in providing the stability of the instrumentation required to generate accurate readings of range and elevation if the instrumentation were attached to the mobile tracker. Thus, the set-up of FIG. 12 is the preferred embodiment.

With reference now to FIG. 13, an alternate on-grade tracking system 14B may be utilized to determine the FIG. 12 parameters of: horizontal range $R_i$ to a target 152, its declination/elevation $D_i$ and left/right position compared to the desired line of a bore designated to be placed at a specified grade. This system 14B utilizes a Real Time Kinematic (RTK) differential GPS survey system 154, 152 in place of the total station of FIG. 12. The surveying method involves initialization of a base receiver 154 at a known (or designated) coordinate position and elevation. The base receiver may utilize either the U.S. Global Positioning System (GPS) satellites 156 or the Russian GLONASS satellites, or both, to acquire its position. The more accurate RTK systems will take advantage of both the civilian (C/A) code and military (P) code from the GPS satellites to generate range measurements to the visible satellites. Such systems are referred to as dual-frequency RTK systems. The base receiver 154 calculates a correction factor for its position based on the received signals from multiple (four or more) satellites and relays 158 this correction factor to a moving "rover" receiver 152. Using the correction factor and GPS position information gathered by the rover receiver, the data from the rover receiver may be processed to provide its position and elevation in effectively real time. Current dual-frequency RTK systems are stated to have horizontal positional accuracies of ±1 cm and vertical accuracies of ±2 cm.

The present embodiment 14B provides for the mounting of the rover receiver 152 of a dual frequency RTK system at a fixed position on a conventional tracker 40 for a directional drilling system. In like manner to the discussion of the use of a robotic total station 144 to monitor the position of a tracking receiver system 20F, alternatively, the RTK system can provide relative elevation and distance data for the tracking receiver system 20F at any point along the borepath compared to initial readings taken at the start of the on-grade segment.

Using the desired grade of the bore, the deviation of the downhole tool 10 from its desired path may be calculated using the horizontal range, left/right positional data, change in elevation of the tracker, and measured depth of the downhole tool 10 using the tracking receiver 20F. Those skilled in the art will recognize that the calculation of deviation from grade using the RTK survey on-grade system 14B is fundamentally the same as that previously disclosed using the robotic total station survey on-grade system 10A. The vertical distance from the roving receiver antenna 152 to the bottom surface of the tracking receiver system—here again designated as $h_F$—will remain constant as before. The deviation from line will be calculated in much the same way. Utilizing the absolute position provided by the rover receiver 20E, the calculation of whether the tracking receiver is to the left or right of the specified directional vector from the starting point is straightforward.

The operator 30 may carry a portable computer linked to both the rover receiver 152 and the tracking receiver system to perform the calculations of deviation from grade and deviation from desired line. Alternatively, the computational electronics may be incorporated directly into a modified tracker or a purpose-built tracking receiver system. A third alternative is to relay the data from the rover receiver and the tracker to the drilling unit 10 via a radio link 42 (FIG. 1) and have the processing of the data done there.

While the ±2 cm vertical accuracy of current dual-frequency RTK systems may introduce some undesired undulations in the borepath, undulations of this magnitude may be removed during the backreaming and/or product placement portion of the HDD process by utilizing bore straightening reamers or steerable backreamer technology—the latter being disclosed in U.S. Patent Application Publication No. 2004/0188142 "Directional Reaming System", incorporated herein by its reference. It should be noted that steerable backreamers (and the variable product placement apparatus disclosed in this reference) typically have at least one pitch beacon 26 (FIG. 1) on board. Thus one of the presently disclosed on-grade tracking systems may also be utilized during the backreaming portion of the HDD process to monitor and direct the path taken by the steerable reamer and/or product pipe. FIG. 13 illustrates the use of a downhole tool 10 comprising a backreamer for installing a utility line in the borehole.

Figure 15:
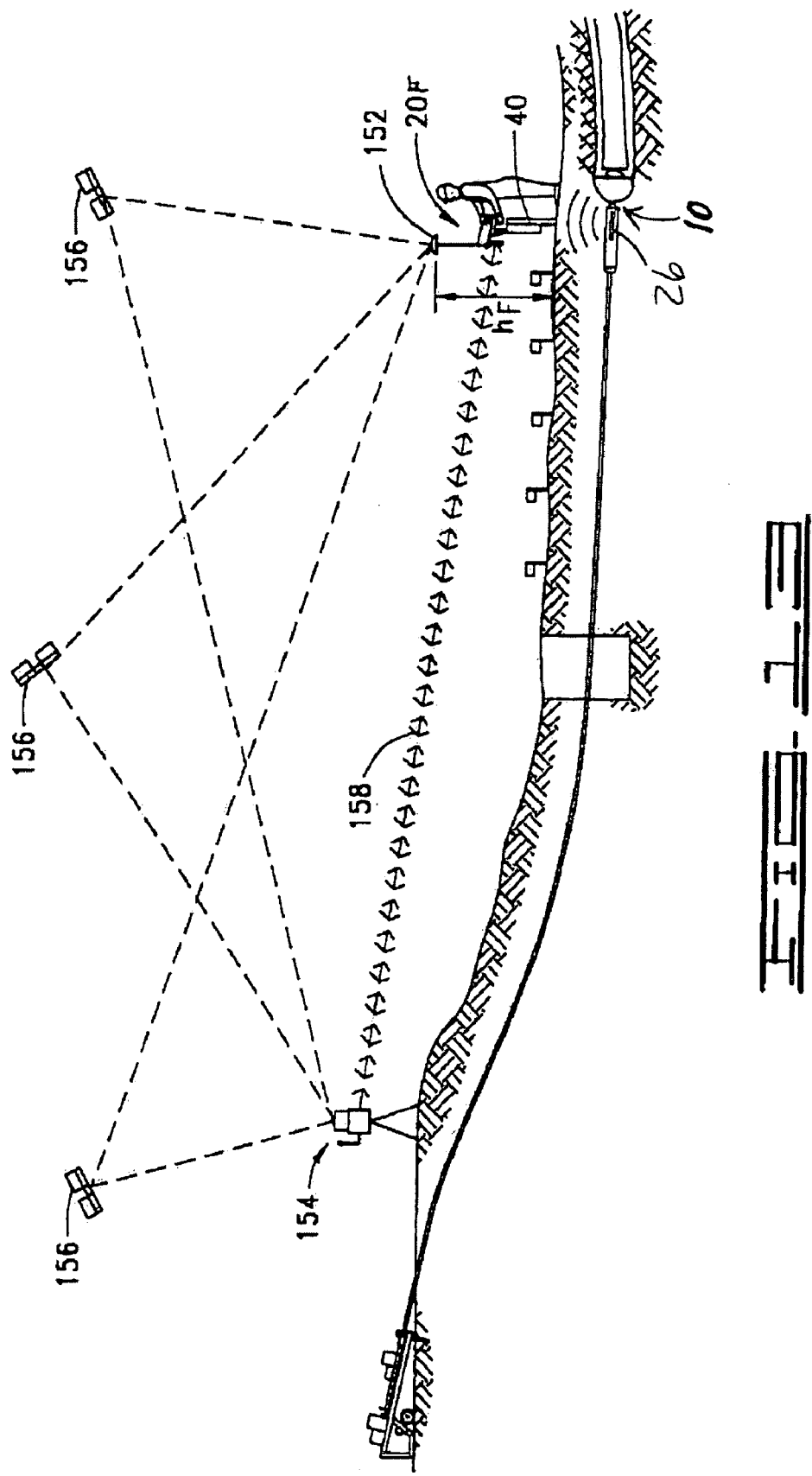
FIG. 15 is a diagrammatic perspective view of the apparatus of FIG. 14.
Figure 14:
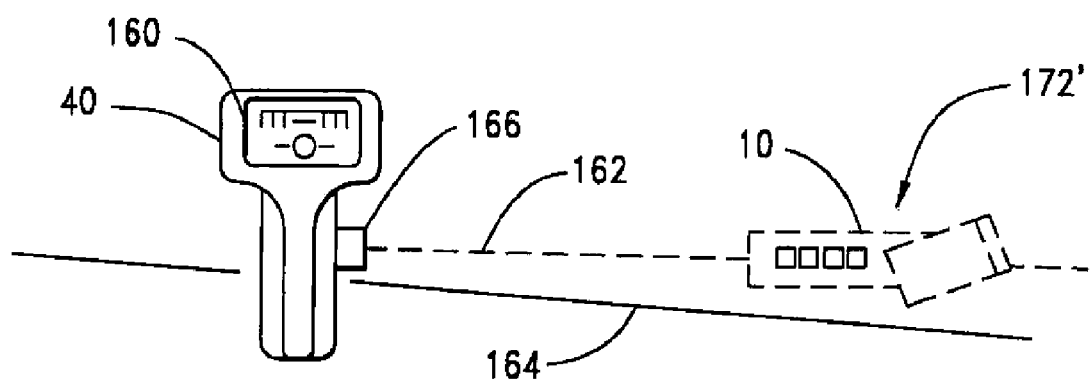
FIG. 14 is an overhead view of an enhancement for the tracking receiver system of the present invention. The enhancement shown in FIG. 14 comprises a laser chalk line adapted to aid the operator in maintaining the desired lateral alignment of the downhole tool with the desired subsurface path.
Figure 15:
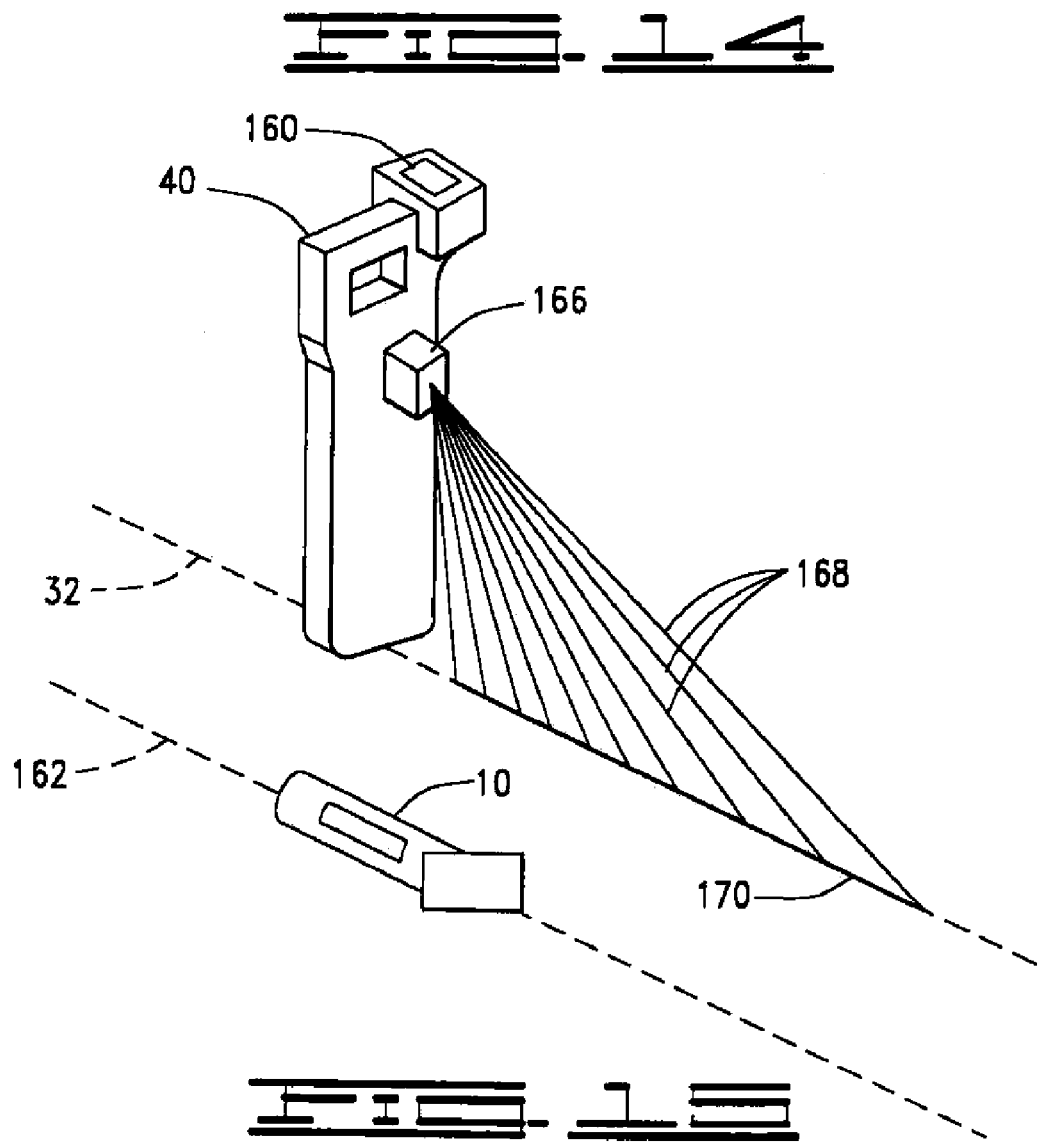
Figure 15:
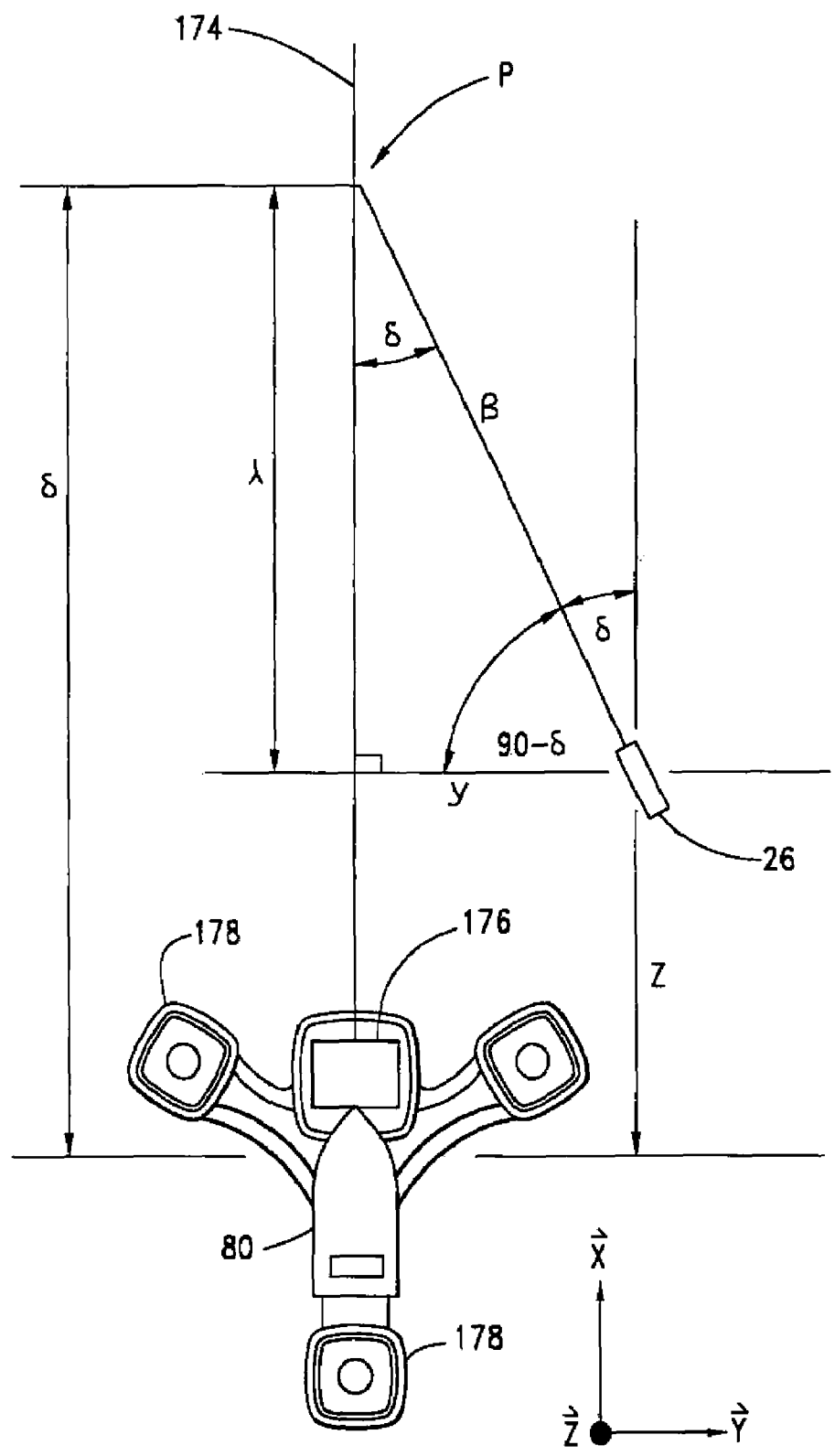

Most if not all, commercially available trackers are able to utilize the characteristic shape of the transmitted dipole magnetic field of the beacon 26 to determine the direction in which the downhole tool 10 is pointing in a horizontal plane—i.e., its left-right heading. To do so with some trackers, the device is positioned directly above the beacon 26 via pinpointing techniques known in the industry. It is then rotated about its vertical axis until the signal strength impinging upon its primary receiving antenna (not shown) from the magnetic field is approximately zero. One skilled in the art will appreciate that for clarity, only the basic tracker 40 is illustrated in FIGS. 14 and 15. One can appreciate that the apparatus and method now being described with respect to tracking may be employed with any of the previously described embodiments. As depicted in FIGS. 14 and 15, the sensor assembly is said to be in its "null" orientation at this point, perpendicular to the transmitting antenna of the beacon in the directional downhole tool 10 with its display 160 indicating zero received signal strength. In other words, the tracking receiver is now oriented perpendicular to the present horizontal left-right heading 162 of the downhole tool 10.

The tracker 40 illustrated in FIGS. 14 and 15 aids the operator to better visualize the actual horizontal heading or "line" 162 being taken by the downhole tool 10 in comparison to the intended path 24 (FIG. 1) that has been pre-marked on the ground surface 32 with a taut string 164, marker flags, a paint stripe, or by other techniques. A laser "chalk line" 166 is mounted such that its "projected line" is perpendicular to the above-mentioned primary receiving antenna and directed generally toward the ground 32. Thus, with the tracker 40 oriented in its null position, the projected line gives a visual representation (on the ground surface) of the direction the directional downhole tool 10 is pointing. In reality, the "projected line" consists of outwardly fanning beams 168 of visible laser light forming a pie-shaped plane, which projects into a line 170 when the beams intersect an approximately perpendicular plane. The laser chalk line 166 could be one of several commercially available handyman tools, so long as its projected light is adequately visible out of doors in bright sunlight.

The overhead view of FIG. 14 shows the downhole tool 10 in a phantom position 172' substantially to the right of the tracker 40, indicating where it would likely be located if corrective action is not taken. For improved clarity, the present position of the downhole tool 10—directly under the tracking receiver—is not illustrated in FIG. 14. However, it is shown in the perspective side view of FIG. 15. For the same reason, the intended path 24 and its pre-marked representation 164 on the ground surface 32 has been omitted from the latter figure. On the basis of the overhead view illustration (FIG. 14), one can envision that these two lines would be angling out of the page toward the viewer. In other words, the downhole tool 10 has deviated leftward of the intended borepath 24 when one is looking in the direction drilling is progressing.

The projected "chalk line" 170 provides the tracker operator with a rapid estimate of present left-right drilling direction 162 as compared to the pre-marked desired direction 164. The disclosed invention aids the operator by providing him or her with a visible projection of the direction of the downhole tool 10 along the surface of the ground to assist in decision-making of possible need for corrective steering in the lateral (left-right) direction. Preferably the laser chalk line device 166 is mounted such that the vertical plane containing its emitted beams 168 intersects the center of the tracking receiver's primary receiving antenna. To mount it otherwise would cause the projected line 170 to not be directly above the downhole tool 10—instead the line would be offset, giving a laterally biased indication to the operator.

Various commercial trackers utilize a variety of techniques to show direction of the beacon. The above explanation of use with the nulling technique of a particular tracker is meant to be representative of how the laser chalk line may be implemented and should not be construed as the only way to marry the two technologies.

An alternate approach for displaying deviation of a downhole tool 10 from the intended left-right line is the system illustrated in FIG. 16. To accomplish this particular task, the tracker 80 of U.S. Patent Application No. 60/680,780 is centered on and aligned with a pre-marked representation 174 of the intended borepath 24 (FIG. 1), then periodically moved forward along that ground surface marking 174 to stay within range of a beacon 26 in the advancing downhole tool 10 (not shown in FIG. 16). Again, for the sake of clarity only the basic tracker 80 is illustrated in FIG. 16. One skilled in the art will appreciate that the apparatus and method of the previously described embodiments of the present invention may be employed with tracker of FIG. 16. The tracker 80 has the capability to convert magnetic field measurements into position coordinates (x,y,z) and the left-right directional heading γ of a beacon relative to itself without being directly above it. The beacon 26 is shown in this overhead view as being a distance z forward of the center of the tracker 80 and at a distance y to the right. It is also at some depth x below the ground surface. The present position and left-right heading γ of the beacon 26 are measured and displayed 176 relative to the present placement (position and orientation) of the tracker 80—now purposefully placed and aligned as mentioned above. Should the downhole tool 10 begin to veer off course laterally, the operator can visually detect that occurrence and instigate a corrective steering action. As is typical in the industry, pitch (a.k.a., inclination or grade), roll angle and beacon operating parameters are also available at the tracker. However, the present focus is directed to information relevant to the horizontal plane of the beacon 26—as depicted in the overhead view of FIG. 16.

If it is assumed that the downhole tool 10 had previously drifted toward the right, away from the desired line. FIG. 16 shows that an initial corrective steering action has been implemented to turn the downhole tool 10 back toward the desired line 174. It is likely that the initial steering action should now or soon be ceased and the downhole tool 10 be advanced with rotation to drill a straight interval. Or an opposite steering action may be called for now (or after a short straight drilling interval) to prevent overshoot of the intended path 174. The operator chooses one of these options for the next drilling interval and estimates how long to maintain that interval before position is again determined and compared to the intended path 174. Wrong choices may result in a more tortuous (zigzag) borepath, potentially unacceptable where close tolerance to the intended path is specified. The following improvement allows the operator to make a more informed choice between these options before embarking on the next drilling interval.

As illustrated in FIG. 16, if maintained on its present heading (by interjecting a straight drilling segment), the beacon 26 will intersect a vertical plane containing the planned borepath at a distance δ forward of the antenna centroid of the tracking receiver. The tracker 80 of Ser. No. 60/680,780 already measures all the parameters necessary to calculate this future intersection point P for the two bore paths (i.e., the actual path intersecting the vertical plane of the intended path). The tracking receiver solves for y, z, and γ. From geometry:

$$\lambda = \frac{y}{\tan \gamma} \qquad \text{(Eq. 5)}$$

and $$\delta = \lambda + z \qquad \text{(Eq. 6)}$$

The remaining drilling distance β to this intersection point is of particular interest:

$$\beta = \sqrt{\lambda^2 + y^2} \qquad \text{(Eq. 7)}$$

One can appreciate that the distance β can readily be corrected (and should be) to account for the length L (not illustrated) from the center of the beacon's transmitting antenna to the forward tip of the boring tool. This directly subtracts from the hypotenuse β of the intersection triangle, while the point of intersection P is unaffected by this consideration. Therefore the distance δ stays the same. The distances y and λ are reduced and the distance z increases. The primary consideration here is that the drilling distance to where the downhole tool 10 intersects with the intended borepath 174 equals β−L. Thus a somewhat shorter drilling interval will be required to reach the desired path than illustrated in FIG. 16. This can be taking into account by displaying 176 numerically adjusted distances. To minimize tortuousity, the theoretical goal is that the downhole tool 10 be re-aligned with the intended path 174 at the same moment it intersects the intended path. To approximate this goal, the straight drilling interval has to be ended and the above-mentioned opposite steering action implemented. The straight drilling interval should be ended at an amount of undershoot (i.e., before arrival at P) determined by such factors as stiffness of the drill string 12 (FIG. 1) and soil parameters that likely vary from one location to another. Such an adjustment can be estimated and mentally made by an experienced operator, or input by him/her to be subtracted from the "return to path" final straight drilling interval estimate displayed 176 by the tracker 80 (and on the remote display 46 of the drill unit 28 in FIG. 1). In close lateral tolerance drilling applications, position and orientation of the beacon 26 may be checked one or more times along this straight drilling segment to verify that the anticipated "corrective line" β is still being followed. It would not be unusual to find that some of the angularity γ back toward the intended path 174 has been lost due to the resisting moment developed in the drill string from the initial corrective steering action.

These above principles may be separately applied to assist the operator in estimating the remaining drilling distance needed to bring a vertically errant downhole tool 10 back onto specified grade and/or depth. Here, a vertical plane containing the intended borepath comes into play. If the left-right heading of the intended borepath follows a curved rather than a straight line, a differently oriented vertical plane might be involved for each new placement position of the tracker 80. Parameters of concern are the pitch reading of the beacon 26 in comparison to the specified grade, and measured depth $d_i$ of the beacon in comparison to the target depth $d_0$ relative to the laser reference plane 22 of system 14.

Note that beacon depth is the coordinate "x" in the x-y-z coordinate system of the referenced Application. For the total station system 144 or RTK GPS system 154 it is the depth error term relative to the Reference Elevation that is of concern. (For a stand-alone tracker, depth x would be compared to pre-planned depth along the path). The depth differential (or depth error term) may be thought of as equivalent to "y" and the slope differential between the beacon's pitch reading and the specified grade is (after conversion from % grade to angular degrees) equivalent to "γ". Equations 3 and 5 can now be used to calculate the straight drilling interval β remaining to return to the specified grade of the bore once the downhole tool 10 has been turned back toward that line 174 by the initial corrective steering action (steer up or steer down, depending upon whether the deviation off course was downward or upward). Again, when correcting in the vertical plane, care must be taken to ensure that the beacon pitch reading does not become positive on a bore with a negative desired grade, and that the beacon pitch reading does not become negative on a bore with a positive desired grade. One skilled in the art could utilize the principles disclosed herein to derive equations for calculating the three-dimensional "range back to target" from a point that is both laterally and vertically off course. In this instance, the three-dimensional angular heading of the beacon with respect to the tracker 80 may be utilized. The heading is calculated from the magnetic field strength measured with three sets of orthogonal antennas 178. Thus the operator can utilize the opposite of this heading for roll orientation or "clock face" of the final steering that will bring the downhole tool 10 back onto the intended path 24 (FIG. 1).

The present invention is further directed to a method for creating an on-grade borehole. The method comprises establishing the reference line 22 (FIG. 1) at a predetermined grade substantially aligned with the grade of the desired subsurface path 24 (FIG. 1). The method includes determining the position of the downhole tool 10 with one of the previously described sensor assemblies and detecting the reference line 22 at the receiving tracker system with a reference line receiver 50. Next, the distance between the reference line receiver 50 and the sensor assembly is measured and used in determining the position of the downhole tool 10 relative to the reference line in conjunction with information regarding the position of the downhole tool.

In accordance with the present method, tracking receiver system disclosed herein may be used to determine the position of the downhole tool in a horizontal plane. Once the horizontal location of the downhole tool has been determined the sensor assembly may be used to detect magnetic field signals emitted from downhole tool to determine the depth of the downhole tool below the sensor assembly. The reference line receiver 50 may also be raised or lowered until it is impinged by the reference line. Upon impingement of the reference line receiver, the distance between the sensor assembly and the reference line receiver is measured. The measured depth value and the measured distance between the reference line receiver and the sensor assembly are then used to determine the distance between the reference line and the downhole tool. The operator may then use this distance to determine if the downhole tool is on-grade with the desired subsurface path.

The present invention is directed to a method for creating an on-grade bore hole using an optical survey system as shown in FIG. 12. In operation, the downhole tool 10 is moved along the desired subsurface path and located at a point along the path using the tracking receiver system 20E comprising a sensor assembly adapted to detect signals emitted from the downhole tool 10. The optical survey system 144 comprising a total station survey system measures the range and elevation of the tracking receiver system 20E relative to a starting above-ground reference point $36_0$ disposed along the desired subsurface path 24. A processor may be supported by the tracking receiver system 20E and adapted to process the signals detected by the sensor assembly and the range and elevation of the sensor assembly, transmitted from the total station 144, to determine the position of the boring tool 10.

Various modifications can be made in the design and operation of the present invention without departing from the spirit thereof. Thus, while the principal preferred construction and modes of operation of the invention have been explained in what is now considered to represent its best embodiments, as herein illustrated and described, it should be understood that the invention may be practiced otherwise than as specifically illustrated and described.

What is claimed is:

1. An on-grade horizontal directional drilling system comprising:
   a downhole tool operatively connected to a downhole end of a drill string, and steerable along a desired subsurface path;
   a reference line generator adapted to establish a reference line having a grade substantially the same as the grade of the desired subsurface path;
   a tracking receiver system comprising:
      a sensor assembly adapted to detect signals emitted from the downhole tool;
      a reference line receiver adapted to detect the reference line;
      a means for measuring a distance between the reference line receiver and the sensor assembly; and
      a processor adapted to process the signals detected by the sensor assembly and the measured distance to determine the position of the downhole tool relative to the reference line.

2. The on-grade horizontal directional drilling system of claim 1 wherein the reference line generator comprises a laser transmitter.

3. The on-grade horizontal directional drilling system of claim 2 wherein the laser transmitter comprises a rotating beam laser level.

4. The on-grade horizontal directional drilling system of claim 2 further comprising a longitudinal frame member adapted to support the sensor assembly and wherein the reference line receiver comprises a plurality of laser sensors disposed along the length of the longitudinal frame.

5. The on-grade horizontal directional drilling system of claim 4 wherein the plurality of laser sensors each comprise a photo detector array.

6. The on-grade horizontal directional drilling system of claim 1 wherein the reference line receiver comprises a laser receiver.

7. The on-grade horizontal directional drilling system of claim 6 wherein the laser receiver comprises a photo detector array.

8. The on-grade horizontal directional drilling system of claim 1 wherein the sensor assembly comprises at least two tri-axial antenna arrays.

9. The on-grade horizontal directional drilling system of claim 1 wherein the means for measuring the distance between the reference line receiver and the sensor assembly comprises a string potentiometer.

10. The on-grade horizontal directional drilling system of claim 1 wherein the means for measuring the distance between the reference line receiver and the sensor assembly comprises an ultrasonic distance measuring device.

11. The on-grade horizontal directional drilling system of claim 1 wherein the means for measuring the distance between the reference line receiver and the sensor assembly comprises a linear variable differential transducer.

12. The on-grade horizontal directional drilling system of claim 1 wherein the means for measuring the distance between the reference line receiver and the sensor assembly comprises a laser distance measuring device.

13. The on-grade horizontal directional drilling system of claim 1 wherein the tracking receiver system comprises an extendable frame member adapted to support the reference line receiver thereon.

14. The on-grade horizontal directional drilling system of claim 13 wherein the extendable frame comprises a first member adapted to support the sensor assembly and a second member supported by the first member and adapted to support the reference line receiver.

15. The on-grade horizontal directional drilling system of claim 14 wherein the means for measuring the distance between the reference line receiver and the sensor assembly comprises a beacon supported on the second member, wherein the sensor assembly is further adapted to detect a signal emitted from the beacon, and wherein the processor is adapted to process the signal emitted from the beacon to determine the distance between the reference line receiver and the sensor assembly.

16. The on-grade horizontal directional drilling system of claim 14 wherein the means for measuring the distance between the reference line receiver and the sensor assembly comprises a magnetic strip disposed on either the first member or the second member and an encoder supported on the first member if the magnetic strip is disposed on the second member or on the second member if the magnetic strip is disposed on the first member.

17. The on-grade horizontal directional drilling system of claim 1 wherein the downhole tool comprises a backreamer.

18. The on-grade horizontal directional drilling system of claim 1 wherein the processor is further adapted to determine the orientation of the boring tool relative to the reference line.

19. An on-grade tracking receiver system adapted to track the progress of a boring tool, the boring tool being steerable along a desired subsurface path substantially parallel with a reference line having a grade, the tracking receiver comprising:
 a sensor assembly adapted to detect signals emitted from the boring tool;
 a reference line receiver adapted to detect the reference line;
 a means for measuring the distance between the reference line receiver and the sensor assembly; and
 a processor adapted to process the signals detected by the sensor assembly and the measured distance between the reference line receiver and the sensor assembly to determine the position of the boring tool relative to the reference line.

20. The on-grade tracking receiver system of claim 19 wherein the reference line receiver comprises a laser receiver.

21. The on-grade tracking receiver system of claim 19 wherein the reference line receiver comprises a photo detector array.

22. The on-grade tracking receiver system of claim 21 further comprising a longitudinal frame member adapted to support the sensor assembly and wherein the reference line receiver comprises a plurality of laser sensors disposed along the length of the longitudinal frame.

23. The on-grade tracking receiver system of claim 22 wherein the plurality of laser sensors each comprise a photo detector array.

24. The on-grade tracking receiver system of claim 21 wherein the reference line receiver further comprises a visual indicator adapted to activate when the reference line is centered on the photo detector array.

25. The on-grade tracking receiver system of claim 19 wherein the sensor assembly comprises at least two tri-axial antenna arrays.

26. The on-grade tracking receiver system of claim 19 wherein the means for measuring the distance between the reference line receiver and the sensor assembly comprises a string potentiometer.

27. The on-grade tracking receiver system of claim 19 wherein the means for measuring the distance between the reference line receiver and the sensor assembly comprises an ultrasonic distance measuring device.

28. The on-grade tracking receiver system of claim 19 wherein the means for measuring the distance between the reference line receiver and the sensor assembly comprises a linear variable differential transducer.

29. The on-grade tracking receiver system of claim 19 wherein the means for measuring the distance between the reference line receiver and the sensor assembly comprises a laser distance measuring device.

30. The on-grade tracking receiver system of claim 19 further comprising an extendable frame member adapted to operatively support the reference line receiver.

31. The on-grade tracking receiver system of claim 30 wherein the extendable frame comprises:
 a first member adapted to support the sensor assembly; and
 a second member operatively connected to the first member for movement relative to the first member, wherein the second member is adapted to support the reference line receiver.

32. The on-grade tracking receiver system of claim 31 wherein the means for measuring the distance between the reference line receiver and the sensor assembly comprises a beacon supported on the second member, wherein the sensor assembly is further adapted to detect a signal emitted from the beacon, and wherein the processor is adapted to process the signal emitted from the beacon to determine the distance between the reference line receiver and the sensor assembly.

33. The on-grade tracking receiver system of claim 31 wherein the means for measuring the distance between the reference line receiver and the sensor assembly comprises a magnetic strip disposed on either the first member or the second member and an encoder supported on the first member if the magnetic strip is disposed on the second member or on the second member if the magnetic strip is disposed on the first member.

34. The on-grade tracking receiver system of claim 19 wherein the processor is further adapted to determine the orientation of the boring tool relative to the reference line.

35. The on-grade tracking receiver system of claim 19 wherein the means for measuring the distance between the reference line receiver and the sensor assembly comprises an electromagnetic signal device adapted to transmit an electromagnetic signal to the sensor assembly.

36. A method for creating an on-grade borehole, the method comprising:
 establishing a reference line at a predetermined grade substantially the same as a grade of a desired subsurface path;

determining a position of a boring tool with a receiving tracker system wherein the receiving tracker system comprises a sensor assembly;

detecting the reference line at the receiving tracker system;

measuring a distance between the reference line and the sensor assembly; and determining the position of the boring tool relative to the reference line based on the determined position of the boring tool and the distance between the reference line and the sensor assembly.

37. The method of claim 36 wherein establishing a reference line comprises generating a laser beam.

38. The method of claim 37 further comprising rotating the laser beam to define a plane.

39. The method of claim 36 wherein the boring tool comprises a beacon and wherein determining the position of the boring tool with the receiving tracker system comprises detecting a signal emitted from the beacon at the receiving tracker system.

40. The method of claim 39 wherein the sensor assembly comprises at least two tri-axial antennas adapted to detect the beacon signal, wherein determining the position of the boring tool comprises laterally offsetting the at least two tri-axial antennas from the boring tool.

41. The method of claim 36 wherein detecting the reference line at the receiving tracker system comprises impinging a reference line receiver with the reference line.

42. The method of claim 41 wherein impinging the reference line receiver further comprises raising or lowering the reference line receiver after determining the position of the boring tool.

43. The method of claim 41 wherein impinging the reference line receiver further comprises raising or lowering the reference line receiver after determining a position of the boring tool within a horizontal plane.

44. The method of claim 41 wherein measuring the distance between the reference line and the sensor assembly comprises transmitting a laser beam from a location proximate the reference line receiver to a target supported proximate the receiving tracker system.

45. The method of claim 41 wherein measuring the distance between the reference line and the sensor assembly comprises transmitting an ultrasonic signal from a location proximate the reference line receiver to a location proximate the receiving tracker system.

46. The method of claim 36 wherein the position of the boring tool is determined with the receiving tracker system laterally offset from the boring tool.

47. The method of claim 36 wherein the boring tool comprises a backreamer, the method further comprising enlarging the on-grade borehole by retracting the backreamer.

48. The method of claim 36 further comprising wirelessly transmitting the measured distance between the reference line and the sensor assembly to the receiving tracker system.

49. The method of claim 36 further comprising determining the position of the boring tool relative to the desired subsurface path.

50. The method of claim 36 further comprising determining a point of intersection between an actual path of the boring tool and the desired subsurface path based on the position of the boring tool determined by the receiving tracker system.

51. The method of claim 36 further comprising calculating the distance between the position of the boring tool and the desired subsurface path.

52. The method of claim 36 further comprising advancing the boring tool along the desire subsurface path using the determined position of the boring tool relative to the reference line.

53. The method of claim 36 further comprising comparing a position of the boring tool relative to the reference line at a point along the desired subsurface path to an initial position obtained disposed near the start of the desired subsurface path to determine the need for steering corrections.

54. A method for determining a position of a downhole tool relative to a reference line, the reference line having a selected grade corresponding with a grade of a desired bore path, the method comprising:

locating the downhole tool with a sensor assembly;

measuring a distance between the downhole tool and the sensor assembly;

locating the reference line and measuring a distance between the reference line and the sensor assembly; and determining a distance between the reference line and the downhole tool based on the measured distance between the downhole tool and the sensor assembly and the measured distance between the reference line and the sensor assembly.

55. The method of claim 54 wherein the downhole tool comprises a beacon and wherein locating the downhole tool with the sensor assembly comprises detecting a signal emitted from the beacon.

56. The method of claim 55 wherein the sensor assembly comprises at least two tri-axial antennas adapted to detect the beacon signal and wherein determining the position of the downhole tool comprises laterally offsetting the at least two tri-axial antennas from the boring tool.

57. The method of claim 54 wherein locating the reference line comprises impinging a reference line receiver with the reference line.

58. The method of claim 57 wherein impinging the reference line receiver further comprises raising or lowering the reference line receiver after locating of the downhole tool.

59. The method of claim 57 wherein impinging the reference line receiver further comprises raising or lowering the reference line receiver after determining a position of the downhole tool within a horizontal plane.

60. The method of claim 57 wherein the reference line receiver comprises a photo detector array and wherein impinging the reference line receiver comprises centering the reference line on the photo array.

61. The method of claim 57 wherein measuring the distance between the reference line and the sensor assembly comprises transmitting a laser beam from the reference line receiver to a target supported on the sensor assembly.

62. The method of claim 57 wherein measuring the distance between the reference line and the sensor assembly comprises transmitting an ultrasonic signal from the reference line receiver to the sensor assembly.

63. The method of claim 54 wherein the position of the downhole tool is determined with the sensor assembly laterally offset from the downhole tool.

64. The method of claim 54 further comprising determining the position of the downhole tool relative to the desired subsurface path.

65. The method of claim 54 further comprising calculating the distance between the downhole tool and the desired subsurface path.

66. The method of claim 54 wherein the downhole tool comprises a backreamer assembly and wherein the method further comprises moving the backreamer assembly along the desired subsurface path using the determined position of the backreamer assembly relative to the reference line.

67. An on-grade horizontal directional drilling system comprising:
- a downhole tool operatively connected to a downhole end of a drill string, wherein the downhole tool is steerable along a desired subsurface path;
- a tracking receiver system comprising a sensor assembly adapted to detect signals emitted from the downhole tool;
- an optical survey system adapted to measure the range and elevation of the tracking receiver system relative to a starting above-ground reference point disposed along the desired subsurface path;
- a processor adapted to process the signals detected by the sensor assembly and the range and elevation of the sensor assembly to determine the position of the boring tool.

68. The on-grade horizontal directional drilling system of claim 67 wherein the optical survey system comprises a total station survey system.

69. The on-grade horizontal directional drilling system of claim 67 wherein the optical survey system is adapted to automatically track the position of the tracking receiver system.

70. The on-grade horizontal directional drilling system of claim 68 wherein the tracking receiver system comprises an optical reflector adapted to reflect an optical signal generated by the total station survey system.

71. The on-grade horizontal directional drilling system of claim 67 further comprising a processing means to compare the range and elevation of the tracking receiver system at any point along a borepath to a target range and elevation based on a grade substantially equivalent to the desired grade of the bore path.

72. The on-grade horizontal directional drilling system of claim 67 further comprising a processing means to calculate the lateral displacement of the tracking receiver system from the desired subsurface path.

* * * * *